United States Patent
Adel et al.

(10) Patent No.: US 10,848,611 B2
(45) Date of Patent: *Nov. 24, 2020

(54) APPARATUS FOR MOBILE APPLICATION AND FREQUENCY SPECTRUM GENERATOR

(71) Applicant: Fraunhofer-Gesellschaft zur Foerderung der angewandten Forschung e.V., Munich (DE)

(72) Inventors: Hans Adel, Stein (DE); Heinrich Milosiu, Erlangen (DE); Maximilian Roth, Nuremberg (DE); Tobias Draeger, Baiersdorf (DE); Matthias Kuba, Nuremberg (DE); Christopher Kaffenberger, Herzogenaurach (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/135,427

(22) Filed: Sep. 19, 2018

(65) Prior Publication Data

US 2019/0020754 A1    Jan. 17, 2019

Related U.S. Application Data

(63) Continuation of application No. 15/856,881, filed on Dec. 28, 2017, which is a continuation of application No. PCT/EP2016/064875, filed on Jun. 27, 2016.

(30) Foreign Application Priority Data

Jul. 15, 2015   (DE) .......................... 10 2015 213 313
Jul. 15, 2015   (DE) .......................... 10 2015 213 314

(51) Int. Cl.
*H04M 1/72*       (2006.01)
*H04M 1/725*      (2006.01)
(Continued)

(52) U.S. Cl.
CPC ....... *H04M 1/72572* (2013.01); *H04W 4/021* (2013.01); *H04W 4/023* (2013.01);
(Continued)

(58) Field of Classification Search
CPC ................................................ H04M 1/72572
(Continued)

(56) References Cited

U.S. PATENT DOCUMENTS 4,001,714 A    1/1977 Reed
2003/0193618 A1   10/2003 Patel et al.
(Continued)

FOREIGN PATENT DOCUMENTS

DE    102010027019    7/2010
EP       2695307 B1   4/2015

*Primary Examiner* — Joel Ajayi
(74) *Attorney, Agent, or Firm* — Perkins Coie LLP; Michael A. Glenn

(57) ABSTRACT

The invention relates to an apparatus for mobile application, including a frequency spectrum generator for generating a frequency spectrum of radio waves at a current position of the apparatus and a classifier for classifying the frequency spectrum such that the frequency spectrum is assigned to one of at least two classes.

29 Claims, 23 Drawing Sheets

(51) Int. Cl.
  *H04W 4/029* (2018.01)
  *H04W 4/02* (2018.01)
  *H04W 4/021* (2018.01)
  *H04W 52/02* (2009.01)

(52) U.S. Cl.
  CPC ........... *H04W 4/027* (2013.01); *H04W 4/029* (2018.02); *H04W 52/0254* (2013.01); *Y02D 70/00* (2018.01); *Y02D 70/142* (2018.01); *Y02D 70/144* (2018.01); *Y02D 70/164* (2018.01); *Y02D 70/166* (2018.01); *Y02D 70/168* (2018.01)

(58) Field of Classification Search
  USPC ...................................................... 455/456.1
  See application file for complete search history.

(56) References Cited

U.S. PATENT DOCUMENTS

| | | | |
|---|---|---|---|
| 2004/0092281 A1* | 5/2004 | Burchfiel | H04B 7/0408 455/522 |
| 2005/0285790 A1 | 12/2005 | Gagnon | |
| 2009/0046625 A1* | 2/2009 | Diener | H04L 1/0001 370/319 |
| 2009/0258597 A1 | 10/2009 | Chen et al. | |
| 2009/0303004 A1* | 12/2009 | Tuttle | G01S 11/10 340/10.1 |
| 2013/0208831 A1 | 8/2013 | Oehler et al. | |
| 2014/0233472 A1 | 8/2014 | Kadel | |
| 2014/0378079 A1 | 12/2014 | Adnani et al. | |

\* cited by examiner

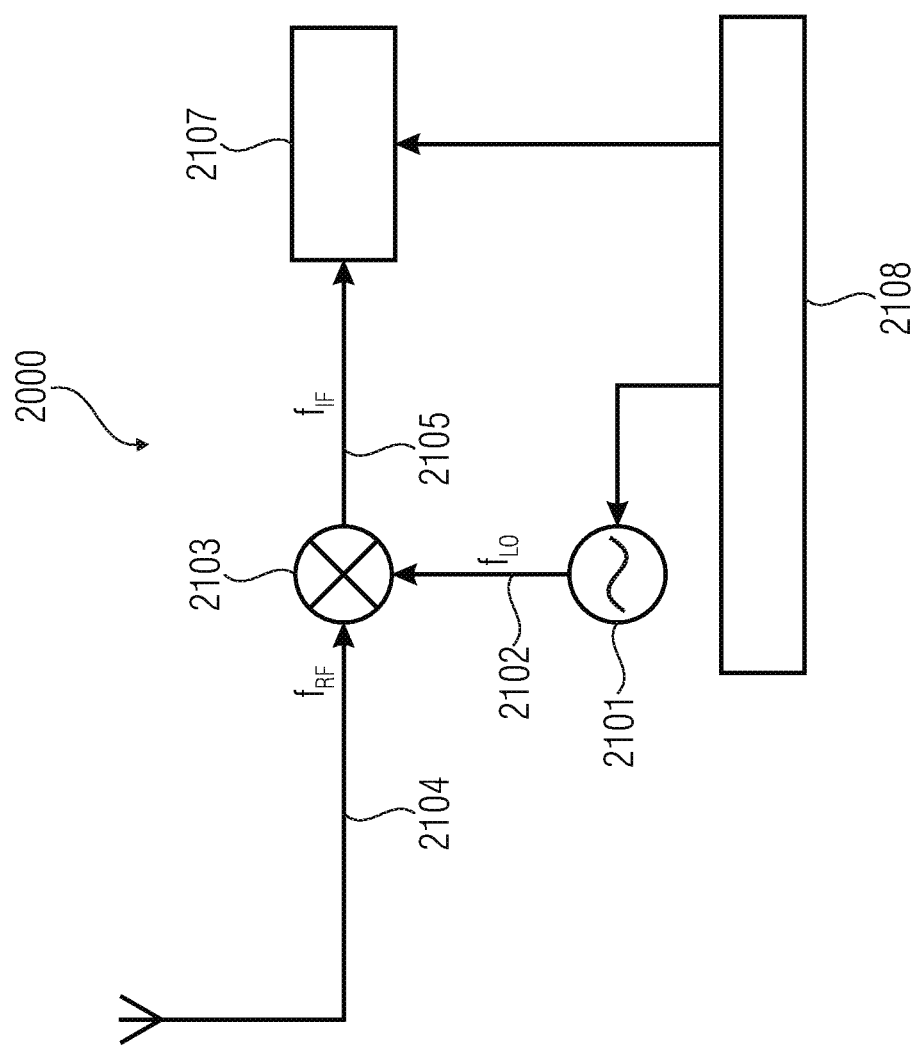

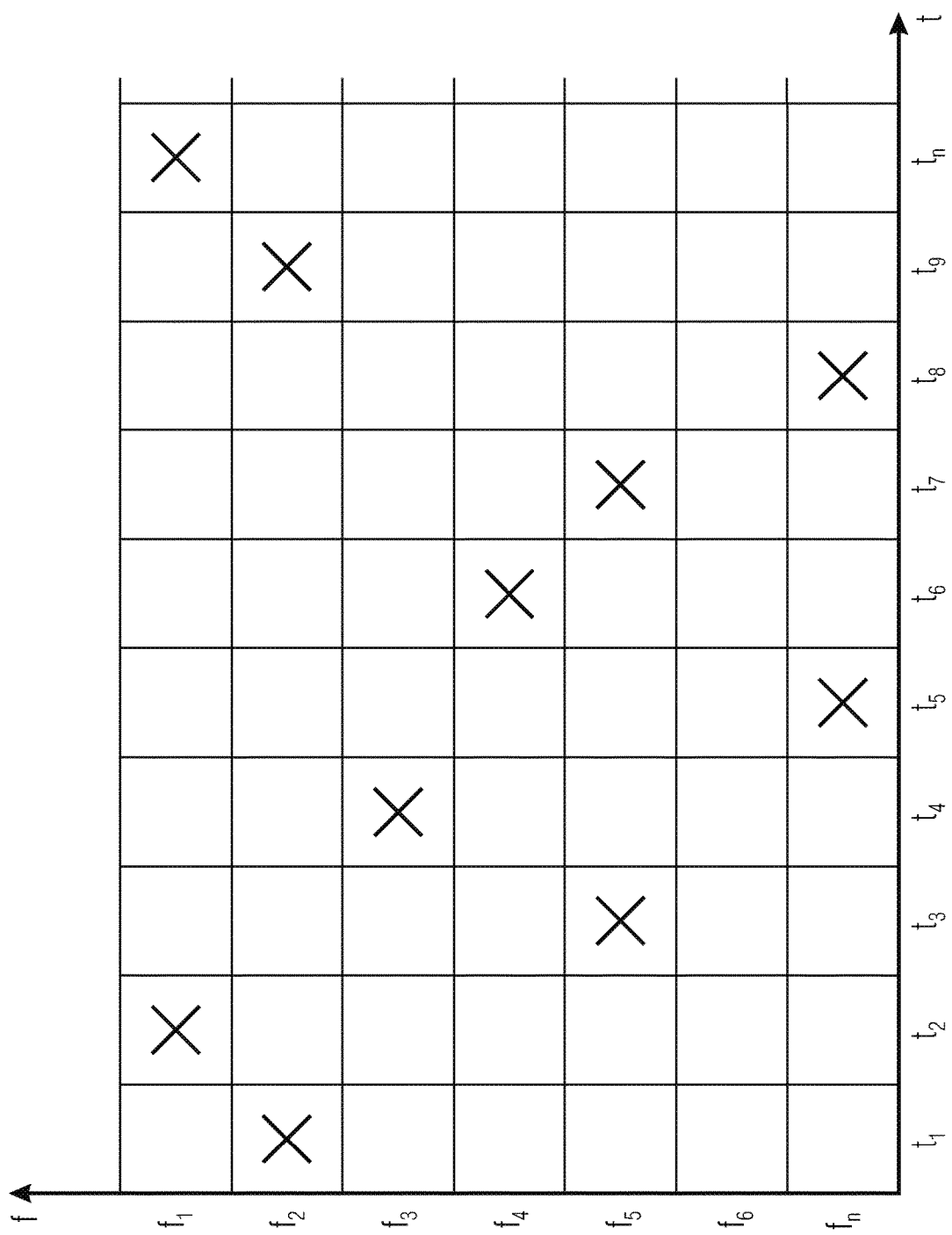

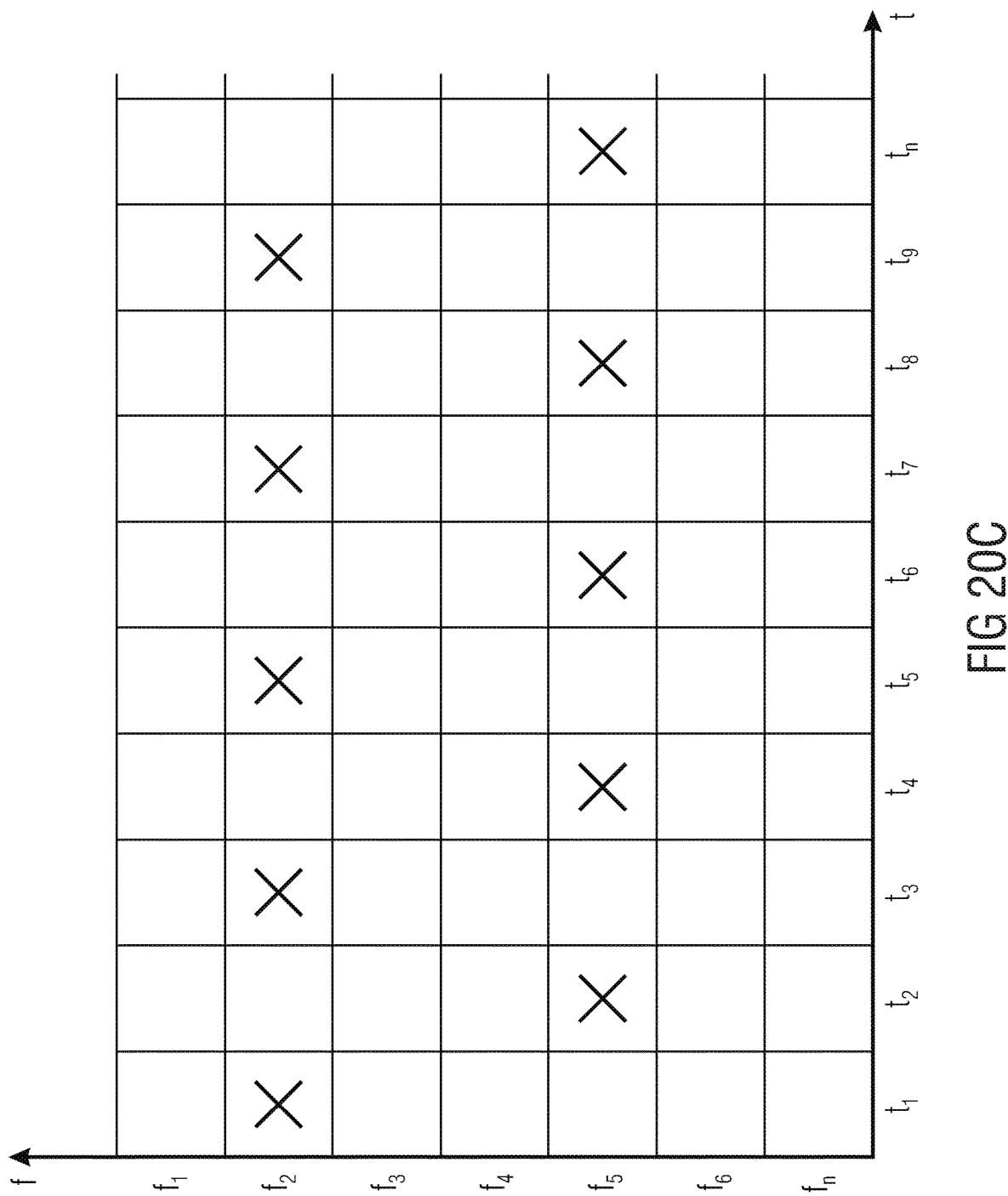

APPARATUS FOR MOBILE APPLICATION AND FREQUENCY SPECTRUM GENERATOR

CROSS-REFERENCE TO RELATED APPLICATIONS

This application is a continuation of U.S. patent application Ser. No. 15/856,881 filed Dec. 28, 2017, which is a continuation of International Application No. PCT/EP2016/064875, filed Jun. 26, 2016, which is incorporated herein by reference in its entirety, and additionally claims priority from German Application No. 10 2015 213 313.3, filed Jul. 15, 2015, and from German Application No. 10 2015 213 314.1, filed Jul. 15, 2015, which are also incorporated herein by reference in their entirety.

A first aspect of the present invention relates to an apparatus for mobile application as well as a system having a tag, a method for operating an apparatus for mobile application and a computer program for executing this method.

BACKGROUND OF THE INVENTION

Apparatuses for mobile application have the advantage that the same can be moved or transported from one location to the next location with little effort. This mobility is additionally facilitated by the fact that such apparatuses are normally portable and that the same have an appropriate small size and an appropriate low weight.

Nowadays, such apparatuses for mobile application are widely used due to their mobility advantages. Additionally, such apparatuses are frequently provided with a plurality of functions in the form of hardware and/or software components. Thus, apparatuses for mobile application frequently comprise radio modules with WLAN, Bluetooth and GPS functionality, active or passive RFID (Radio Frequency Identification) components as well as many further interfaces.

Known apparatuses for mobile application are, for example, mobile devices such as mobile phones, tablets, notebooks and the same. Other known apparatuses for mobile application are so-called tags, such as RFID tags and respective readers for reading out these tags. Such tags are indicators, in particular identification indicators, for example in the form of marks, labels, stickers and the same. These tags can be optionally attached to different subjects in order to be able to uniquely identify the subjects marked in that way.

Apparatuses for mobile application can also be provided in means of transport, such as automobiles or other vehicles. A car radio that can receive different radio stations at different locations is an apparatus for mobile application, for example.

Apparatuses for mobile application have the advantage that the same can be operated at different locations due to their simple transportability. Advantageously, these apparatuses provide all functions at all these locations. However, at some specific locations, these apparatuses may provide their functions only in a limited way or possibly not at all, such as mobile radio reception of a mobile phone in an underground parking garage. On the other hand, a function might not be desirable in a specific situation or at a specific location despite the provision, such as a loud ring tone in a meeting.

Thus, it would be desirable to provide apparatuses for mobile application or to improve the same such that these apparatuses can be specifically operated, for example in a location-specific and/or situation-specific manner.

SUMMARY

According to an embodiment, an apparatus for mobile application may have: a frequency spectrum generator for generating a frequency spectrum of radio waves existing at a current position of the apparatus and a classifier for classifying the frequency spectrum such that the frequency spectrum is assigned to one of at least two classes.

According to another embodiment, a system with a tag may have: a frequency spectrum generator for generating a frequency spectrum of radio waves existing at a current position of the tag, a memory for storing the frequency spectrum at different generation times and a tag reader for reading out the memory of the tag and deriving position information of the tag at a time at or between the generation times.

According to another embodiment, a method for operating an apparatus for mobile application may have the steps of: generating a frequency spectrum of radio waves existing at a current position of the apparatus, classifying the frequency spectrum such that the frequency spectrum is assigned to one of at least two classes.

Another embodiment may have a non-transitory digital storage medium having a computer program stored thereon to perform the method for operating an apparatus for mobile application, the method having the steps of: generating a frequency spectrum of radio waves existing at a current position of the apparatus, classifying the frequency spectrum such that the frequency spectrum is assigned to one of at least two classes, when said computer program is run by a computer.

The inventive apparatus solves this object in that environmental conditions are estimated and classified. In the inventive apparatus for mobile application, the frequency spectrum generator detects at least a certain part of radio waves existing at a current position, such as radio waves of radio services or radio transmitters and/or radio interferences that can be received at this position. Then, from the received and detected radio waves of different frequencies, the frequency spectrum generator generates a frequency spectrum in which the individual frequencies of the detected radio waves can be determined. The frequencies determined in that way can be mapped in a spectrogram. The classifier classifies this frequency spectrum, i.e. he assigns this frequency spectrum to a specific class. Here, the classifier classifies the frequency spectrum selectively into one of at least two different classes. Frequently, a frequency spectrum generated at a specific position comprises one or several features characteristic for this location and this position, respectively, such as a signal receive level of a frequency of a local radio station. The inventive apparatus detects these characteristic features in the generated frequency spectrum and thereupon the classifier classifies this frequency spectrum into a specific class. Here, different classes can have and represent different characteristics, respectively. For example, the classifier classifies the frequency spectrum generated at the above-mentioned specific position into a class representing this position (e.g. a region) where this received regional radio station with the detected frequency is broadcast. The classes can, for example, also be differentiated as to whether the position of the apparatus where the frequency spectrum had been generated is within a building or in an open space. In other words, the inventive apparatus can, for example identify a specific position based on the characteristic frequency spectrum that is generated there.

The classes can possibly also represent a velocity of movement of the inventive apparatus. Additionally, the inventive apparatus can comprise a behavior characteristic for the respective class, based on the generation of the frequency spectrum generated at a position and the classification into classes. It is possible that the apparatus receives or transmits internal or external signals in dependence on the class, i.e. the apparatus can, for example, control devices, store data in a memory or read the same from a memory etc. Thus, based on a frequency spectrum generated at a specific position, the inventive apparatus can be operated and used in a class-specific manner, i.e. depending on the need or situation.

The classifier can be an internal or external classifier. An internal classifier is connected to the inventive apparatus. An internal classifier, for example, can be incorporated and implemented in the inventive apparatus, respectively. An external classifier is configured as a unit independent from the inventive apparatus, i.e. an external classifier can, for example, be incorporated and implemented in a device external to, i.e. separated from the inventive apparatus. The external classifier can, for example be incorporated and implemented, respectively in a reader for reading out data of the inventive apparatus. The external classifier can, for example, also be incorporated and implemented, respectively, in a computer. An external classifier is not connected to the inventive apparatus, but can be connectable to the inventive apparatus. According to the invention, the classifier is provided for classifying the frequency spectrum, independent of whether the same is an internal or an external classifier and such that the frequency spectrum is assigned to one of at least two classes.

It is possible that the frequency spectrum generator is configured to generate frequency spectra in a frequency band between 30 KHz and 30 GHz, advantageously between 30 MHz and 30 GHz, more advantageously between 30 MHz and 5 GHz and most advantageously between 80 MHz and 1 GHz. In that way, the inventive apparatus can detect radio waves of selected frequencies, while radio waves having frequencies outside the respective frequency band are not detected. Thus, the apparatus can be easily and quickly adjusted to existing conditions. Above that, by specifically selecting the frequency band, the frequencies desired for generating the frequency spectrum can be determined, such that the generation of the frequency spectrum is performed precisely and with high processing speed.

The frequency spectrum generator can be configured as a radio receiver having a tunable local oscillator or as a radio receiver having a tunable receiver circuit. With such a frequency-tunable and frequency-variable radio receiver, respectively, simple and good reception of radio waves having different frequencies can be realized.

The frequency spectrum generator can be configured to detect the frequency spectrum intermittently. In that way, frequency spectra can be detected at different times, wherein the times can be selected arbitrarily and can be adapted, for example such that the frequency spectra are frequently detected, wherein the detection can be performed with high accuracy, or such that the frequency spectra are detected less frequently, such that detection can be performed in an energy-saving manner.

The frequency spectrum generator can be configured to serially sample the frequency spectrum at discrete frequencies of a frequency raster. In that way, simple, resource-saving and fast signal processing with discrete values can be realized.

The order of sampling the discrete frequencies between a first and a second sampling process can vary. For example, the sampling order can be in pairs or according to a predetermined non-linear scheme and pattern, respectively. In that way, aliasing effects when generating a frequency spectrum can be advantageously reduced.

It is possible that the order of sampling the discrete frequencies is selected arbitrarily. In that way, the occurrence of aliasing effects when generating the frequency spectrum can still be advantageously reduced.

The classifier can perform classification based on signal levels of the frequencies within the frequency spectrum. Based on the signal levels, the reception strength of a signal of a specific frequency can be determined within the generated frequency spectrum. In that way, classification can be performed simply and quickly, wherein a reaction to varying signal levels can take place quickly, for example when the position of the apparatus is changed from open space to an interior of a building.

Above that, it is possible that the classifier performs classification based on the temporal variation of the frequencies within the frequency spectrum. Within a specific time interval, for example at the time between generating two frequency spectra, the frequencies and frequency portions, respectively, or their respective signal levels occurring in the frequency spectra can change. Accordingly, for example, the behavior of the inventive apparatus can be adapted. With significant changes within a specific time interval, for example, the frequency of generating frequency spectra can be increased. If, however, only few or no changes occur in a specific time interval, the frequency of generating frequency spectra can be reduced. Additionally, the velocity of the inventive apparatus can be estimated by means of the temporal variations.

The apparatus can comprise a preselection (preset) of at least one previously classified frequency spectrum. A preselection of previously classified frequency spectra can serve as reference for the classification of subsequently generated frequency spectra. When the previously classified frequency spectra have been generated under very good conditions, i.e. without significant interferences, the same can have high quality. The apparatus can, for example, comprise a preselection of different frequency spectra that comprise characteristic features for specific positions, such as a clear receive level of a frequency of a local radio station.

It is possible that the apparatus is configured to compare a frequency spectrum generated at a position of the apparatus with the at least one previously classified frequency spectrum. Such a preselection of previously classified frequency spectra is stored in a memory of the apparatus. In that way, a frequency spectrum generated at a specific position can be compared to the preselection of previously classified frequency spectra stored in the memory. When the generated frequency spectrum matches the previously classified frequency spectrum stored in the memory, the generated frequency spectrum is classified into exactly this class. Matching a frequency spectrum generated at a specific time and a specific position, respectively, with a preselection of previously classified frequency spectra accelerates and eases the assignment of the generated frequency spectrum to a specific class to be performed by the classifier. A preselection of a previously classified frequency spectrum can, for example include different signal levels of a specific radio station, wherein the signal levels decrease in dependence on the distance of the receiver from the radio station. Such a preselection includes the distance from the radio station belonging to a specific signal level. As soon as the inventive apparatus generates a frequency spectrum including one of the previously classified signal levels of the radio station, the frequency spectrum generator detects this by a comparison with the above-mentioned preselection and classifies this frequency spectrum, when the same matches with a previously classified frequency spectrum, into exactly this class.

A class determined by the classifier can represent a position of the apparatus and the apparatus can have an interface for displaying this position. In that way, it can be displayed to a user into what class a specific frequency spectrum has been classified and what position this corresponds to. Interaction with a user can also be possible.

Possibly, the apparatus can comprise a user interface that is configured to display a frequency spectrum generated at a position of the mobile device to a user. Thus, the user has the option of looking at a generated frequency spectrum. This can be the frequency spectrum generated currently at the current position. It can also be a frequency spectrum that had been generated at an earlier time and/or at another position and had been stored in a memory of the apparatus. In that way a user can look at a current frequency spectrum or at one generated at an earlier time. For this, the representation of the generated frequency spectrum in a spectrogram is well-suited.

Further, the apparatus can comprise a user interface that is configured to classify a frequency spectrum based on an input of a user. In that way, the user can, for example, perform specific classifications such that he assigns a currently generated frequency spectrum or a frequency spectrum possibly recorded at an earlier time to a class, such as a specific position. Additionally, the user can change and overwrite, respectively, a classification already performed by the classifier. The user can, for example, classify a frequency spectrum generated at home as class "homezone". In the class "homezone", the apparatus can perform different actions or can have different settings. These settings can be linked to the class "homezone". When this frequency spectrum is generated again, for example when the user, after leaving, re-enters his "homezone" again with the apparatus, the apparatus recognizes this newly generated frequency spectrum again as class "homezone". Then, the apparatus can restore the previous settings, e. g. operating states. In other words, the user selects a current frequency spectrum or a frequency spectrum generated at an earlier time, for example in the form of a spectrogram. The user can control the classifier via the user interface, and can classify the selected frequency spectrum. Thus, the apparatus is trained by the user at different positions. Alternatively, the existing radio and localization services are involved for increasing the location accuracy. Such self-learning methods can successively refine the classification.

It is possible that the apparatus comprises a calculator for calculating a velocity of movement of the apparatus based on the strength of the frequency spectrum at at least one existing frequency at subsequent detection times. Pulsing spectral lines of a fixed frequency (e.g. in the TETRA-BOS radio system 380 MHz-395 MHz which is well-developed in Germany) can, for example be used for estimating the velocity in the urban area where reflecting or absorbing objects (houses, lamps, traffic lights, trucks, containers, etc.) exist. By partially deleting arriving and reflected radio waves at a frequency $f_{RX}$ in multipath fading, the velocity of the inventive apparatus can be estimated starting from the time period $\Delta t$ between two adjacent minima. In that case, the classification of the respectively generated frequency spectrum can be made as "in motion" or "not in motion". However, the classifier can also classify the frequency spectra into velocity classes representing different velocities of movement of the apparatus.

The apparatus can comprise an interface, in particular a wireless interface for connecting and communicating with an external device. Via that interface, the apparatus can exchange information, such as information on classified or non-classified frequency spectra with a device, such as a reader.

Alternatively or additionally, the apparatus can comprise an interface for connecting and communicating with a mobile device having at least one component operable in a first and in a second operating state, wherein the apparatus is configured to control the mobile device such that the at least one component is operated selectively in the first or in the second operating state depending on the assigned class. In that way, the at least one component in the mobile device can be placed in a selected operating state, depending on the respective class, i.e. for example depending on the need and/or environment. The at least one component can, for example, be placed in a sleep mode with lower energy consumption, or the at least one component can be switched on or off when the same is not used or should not be usable, such as a mobile radio service and a mobile radio modem, respectively, in an underground parking garage where no or only insufficient mobile radio signals can be received.

It is possible that the at least one component is an energy-operated member having a higher energy consumption in the first operating state than in the second operating state. In that way, the operating state of the at least one component can be controlled according to the environment and/or need. For example, the power of a WLAN module of a mobile device in a basement room can be reduced when no or only insufficient WLAN signals can be received.

It is possible that the energy-operated member is deactivated in the second operating state. In that way, for example, the operating state of a WLAN module can be controlled such that the same is deactivated at a position having poor or no WLAN network coverage.

It is possible that the at least one component is a service providing a function of the mobile device and the service is active in the first operating state and inactive in the second operating state. Such a service is a functionality provided by the mobile device. The service can, for example be a radio service, a software implemented control of a member, such as a display, a specific user profile, a ring tone and the same. Depending on the assigned class, these services can be operated in a first or second operating state. In that way, the inventive apparatus can control, for example, a mobile phone such that in a cinema hall services like GPS reception are deactivated, the display brightness is reduced and the ring tone profiles are muted.

The mobile device can be a mobile phone, a smartphone, a tablet, a notebook or the same. Currently, such mobile devices are easily accessible and easy to operate for users. Thus, these mobile devices are particularly well suited for the usage of the inventive apparatus for mobile application.

Further, a system is suggested comprising a tag having a frequency spectrum generator for generating a frequency spectrum of radio waves existing at the current position of the apparatus, a memory for storing the frequency spectrum at different generation times and a tag reader for reading out the memory of the tag and deriving position information of the tag at a time at or between the generation times. Such a tag can detect the radio waves existing at the respective position at different times and can generate a frequency spectrum comprising the respective frequencies. These frequency spectra can be stored. The memory can be read out by an external reader. Normally, the frequency spectra generated at different times comprise one or several characteristic features prevailing at the respective generation time at this position. In that way, for example, the position of the tag at the generation time of the respective frequency spectrum can be determined based on the evaluation of these generated frequency spectra. However, from such position information, a velocity of movement of the tags can be derived, for example by evaluating the time course of several subsequently generated frequency spectra. With an inventive system, the history of a tag as well as of a previously discussed inventive apparatus for mobile application can be determined in that the frequency spectra generated at different times and/or at different positions are read out from the memory.

Further, a method for operating an apparatus for mobile application is suggested, the method comprising: generating a frequency spectrum of radio waves existing at the current position of the apparatus, classifying the frequency spectrum such that the frequency spectrum is assigned to one of at least two classes. With this method, the above-stated advantages result and the object underlying the invention is solved by this method.

Further, for solving the problem underlying the invention, a computer program having a program code for performing the inventive method is suggested.

Advantageously, the apparatus comprises a user interface for setting the operating states of the components in the mobile device. Via this interface, the user can interact with the apparatus such that he can, at first, select a frequency spectrum. Then, the user can select operating states of the components of the mobile device and can assign these operating states to the generated frequency spectrum. According to this, a specific operating state of a component in the mobile device can be assigned to each frequency spectrum. The operating states can also be preset by the manufacturer.

A preselection of previously classified frequency spectra and respectively allocated operating states is also referred to as spectrogram fingerprint. Thus, based on known stored spectrogram fingerprints it is possible to securely detect specific locations, such as the apartment, the office, stations, airports, etc., which can again be used for switching the respective components of the mobile device into the suitable operating state.

The number of previously classified frequency spectra included in a preselection (preset) can be determined by the manufacturer and/or determined or extended by a user. The degree of matching of a current frequency spectrum with a previously classified frequency spectrum can be adjusted and can range from a match of 50% to 100%. Reliable classifications are obtained with a match of 75% and more.

The apparatus can be configured to assign different frequency spectra to different positions. These positions can again be arranged with relative distances to one another and can be plotted on a map. In that way, the approximate position can be determined based on these data, and when the same frequency spectrum is detected again, respectively. It is also possible that the apparatus is configured to store a frequency spectrum generated at a specific position together with geo data, such as GPS coordinates of this position.

The amount of data of a spectrogram, i.e. the number of samples times the number of discrete frequencies of a detected frequency spectrum is less than 10000 and advantageously less than 1000. Thus, the inventive apparatus is configured such that N is the number of discrete frequencies in the frequency spectrum, wherein M is the number of samples at the discrete frequencies, such that N*M<10000 and advantageously N*M<1000 results. Due to the low amount of data (e.g. <10000 bits and <1000 bits) the spectrograms can be evaluated in a power-saving mode by simple algorithms without needing complex arithmetic units as in digital signal processors.

A second aspect of the present invention relates to a frequency spectrum generator. This frequency spectrum generator of the second aspect of the invention can be used, for example, in the apparatus according to the first aspect of the invention.

Currently, modern communication systems and in particular mobile communication means are configured for wireless data transmission. For efficient data transmission, the signals are upmixed on the transmitter side in order to transmit the same to a receiver via higher carrier frequencies. The receiver downmixes the received signals again in order to obtain the actual useful signal.

DE 10 2010 027 019 A1 discloses a receiver arrangement with an analog receiver and a downstream digital evaluation apparatus. The analog receiver comprises an RF amplifier, a mixer connected to a free-running local oscillator, an IF low-pass, and IF amplifier and an amplitude modulator. The receiver arrangement is based on a radio receiver operated in a sampling manner sampling the radio channel in intervals at a fixed receive frequency. Additionally, the analog receiver can be operated in two phases, wherein in the first phase the sampling rate is lower than in the second phase. Thereby, in the first phase, the known receiver arrangement operates with less power consumption than in the second phase.

However, nowadays, frequency band occupancies are frequently very high. For analyzing the bands occupied in a frequency band, portions of frequency bands of a desired width can be scanned. The frequency portions of existing, i.e., detected signals can be illustrated in a frequency spectrum. Known radio scanners used for this, however, have a very high current consumption of 200 mA or more. Thus, battery operation of such devices is only possible to a very limited extent.

It is desirable to provide receivers that allow sampling of a radio channel at variable receive frequencies that can still be operated in a power-saving manner. In other words, it is desirable to provide a power-saving receiver for detecting frequency band occupancy in order to generate, for example, a frequency spectrum of a received radio signal.

One option for such a receiver is the super regenerative receiver architecture known from EP 2 695 307 B1 that provides a digital value from an arriving antenna signal as receive level. Based on the used active, among other, digital members, this receiver architecture cannot be implemented in a power-saving manner to the desired extent.

So far, no electronic circuit below 100 μA current consumption is known that can be used for fast detection of frequency band occupancy, for example, in the UHF range. However, this is desirable, for example, for realizing mobile cognitive radio systems. However, so far, there is no power-saving solution for spectral detection. Solutions known so far have current consumptions of 200 mA. With that, battery-operated solutions are hardly possible. Apart from the power-saving implementation, a fast as well as continuous repetitive detection of the band occupancy is desirable.

Additionally, undesired mirror-frequency portions occur in the above-mentioned downmixing. In addition to fast power-saving detection of a spectrum, retuning of a mirror-frequency filter is desirable in order to filter out undesired mirror-frequency portions. However, this is not done in known Sub-1 GHz radio receivers in order to implement a radio scanner since rigid SAW bandfilters are assumed.

According to an embodiment, a frequency spectrum generator may have: a tunable local oscillator for outputting a local oscillator signal, a downmixer for downmixing a received antenna signal with the local oscillator signal for obtaining a downmixed signal, a filter for filtering out a mirror-frequency portion of the antenna signal in the downmixed signal, a signal level detector for detecting a signal level of the downmixed signal at an intermediate frequency, and a control for sequential control of the local oscillator and the signal level detector for sampling a frequency spectrum of the antenna signal at a sequence of sampling frequencies.

According to another embodiment, a frequency spectrum generator may have: a tunable local oscillator for outputting a local oscillator signal, a downmixer for downmixing a received antenna signal with the local oscillator signal for obtaining a downmixed signal, and a signal level detector for detecting a signal level of the downmixed signal at an intermediate frequency; and a control for sequentially controlling the local oscillator and the signal level detector to sample a frequency spectrum of the antenna signal at a sequence of sampling frequencies, wherein the ratio of switch-on period $T_{ON}$ for a sampling process to sampling period $T_A$ is selected such that the average total current consumption $$I_{AVG} = \frac{T_{ON}}{T_A} \cdot I_{ON}$$

is less than or equal to 100 μA, wherein $I_{ON}$ designates the current consumption in an active state during sampling.

The inventive frequency spectrum generator operates in a power-saving manner, since merely simple circuit components are used, wherein the frequency spectrum generator is sequentially controlled to sample the frequency spectrum. This means there are times when the frequency spectrum generator is active as well as times when the frequency spectrum generator is inactive. The simultaneous fast detection and evaluation of receive spectra with at the same time low current consumption enables that an operation, for example with coin cells is possible for years and the operating period with already available energy storage is hardly reduced, respectively. Additionally, the inventive frequency spectrum generator has the advantage that undesired mirror-frequency portions changing in dependence on the sampling frequency can be filtered out. This is obtained, among others, by skillful selection of the local oscillator frequency.

The control can be configured to change the frequency of the local oscillator signal at a respective sampling frequency such that the respective mirror-frequency portion lies below and above, respectively, the frequency range of the sampled frequency spectrum. Here, the selection of the local oscillator frequency determines the position of the mirror-frequency portion. With this embodiment, it is suggested to select the frequency of the local oscillator signal such that at one sampling frequency the mirror-frequency portion lies below or above the entire frequency spectrum. Thus, the mirror-frequency portions do not occur at all or not in a relevant manner in the receiver, i.e., on the intermediate frequency side. At the same time, this relaxes the demand on the characteristic of the filter as regards to suppressing the mirror-frequency portion.

In one embodiment, the control is configured to operate the local oscillator in two operating modes, wherein the local oscillator is controlled in a first operating mode such that the frequency of the local oscillator signal lies above the respective sampling frequency, and wherein the local oscillator is controlled in a second operating mode such that the frequency of the local oscillator signal lies below the respective sampling frequency. In other words, the local oscillator is configured such that a so-called high-side injection or a so-called low-side injection can be performed. During high-side injection, the frequency of the local oscillator signal is selected such that the same lies above the respective receive and sampling frequency, respectively. In contrary to that, during low-side injection, the frequency of the local oscillator is selected such that the same lies below the respective receive and sampling frequency, respectively. Since, as mentioned above, the selection of the frequency of the local oscillator signal determines the location of the mirror-frequency portions at the respective sampling frequency, the selection of the operating mode, i.e., the selection between high-side injection and low-side injection has respective effects on the location of the mirror-frequency portion that is shifted accordingly either towards higher or towards lower frequencies.

The control can be configured to switch between the two operating modes during the process of sampling the frequency spectrum of an antenna signal. In other words, the inventive frequency spectrum generator is able to switch between high-side injection and low-side injection during operation, i.e., during a frequency sweep. This is advantageous in that the location of the mirror-frequency portion can be placed skillfully outside the desired frequencies and, in particular, outside the frequency band of the antenna signal to be sampled.

In one embodiment, the control is configured to switch between the two operating modes exactly when downmixing of the antenna signal with the local oscillator signal would result in a mirror-frequency portion that lies within the frequency spectrum to be sampled. Thus, if it is determined during operation that, for example, an upcoming sampling process in a high-side injection mode would result in a mirror-frequency portion lying within the frequency band of the antenna signal to be sampled, switching to low-side injection is performed, such that the stated upcoming sampling process would then result in a mirror-frequency portion that lies outside, more accurately below the frequency band of the antenna signal to be sampled.

In one embodiment, the filter comprises a filter control for changing the filter characteristic, and the filter control is configured to change the filter characteristic in dependence on the selected frequency of the local oscillator signal. In that way, the filter characteristic can be changed in dependence on the selected frequency of the local oscillator signal in order to realize either a high pass, a low-pass or band pass characteristic having desired pass and block frequency.

Here, the filter control can be configured to change the filter characteristic of the filter such that the mirror-frequency portion is filtered out from the antenna signal at the respective sampling frequency. As already mentioned before, the frequency of the local oscillator signal determines the location of the mirror-frequency portion. With the suggested embodiment, the filter can be tuned such that the respective mirror-frequency portion of different sampling frequencies is filtered out. Thus, the filter and the filter control, respectively, operate adaptively in reaction to the respectively selected frequency of the local oscillator signal, i.e., the respective position of the mirror-frequency portion. In other words, a tunable mirror-frequency filter is provided which can filter out mirror-frequency portions of different frequencies from the antenna signal. This mirror-frequency filter can be retuned easily to an adjustment of the local oscillator frequency and can be adapted to the current local oscillator frequency, respectively.

In a further embodiment, a frequency spectrum generator having the features of claim 65 is suggested. This frequency spectrum generator comprises, among others, a control for sequentially controlling the local oscillator signal and the mirror level detector in order to sample a frequency spectrum of the antenna signal at a sequence of sample frequencies, wherein the ratio of switch-on period $T_{ON}$ for a sampling process to sampling period $T_A$ is selected such that the average total current consumption $$I_{AVG} = \frac{T_{ON}}{T_A} \cdot I_{ON}$$

is less than or equal to 100 µA, wherein $I_{ON}$ designates the current consumption in an active state during sampling. Accordingly, an extremely power-saving frequency spectrum generator is suggested enabling operation, for example with coin cells, for years, and the operating duration with already available energy storages being hardly reduced, respectively.

BRIEF DESCRIPTION OF THE DRAWINGS

Embodiments of the present invention will be detailed subsequently referring to the appended drawings, in which:

FIG. 19 is a schematic block diagram of an inventive frequency spectrum generator, FIG. 20B is a table for illustrating sample values according to an arbitrary order, FIG. 20C is a table for illustrating sample values according to an alternating order of two sample frequencies of interest.

DETAILED DESCRIPTION OF THE INVENTION

Figure 1:
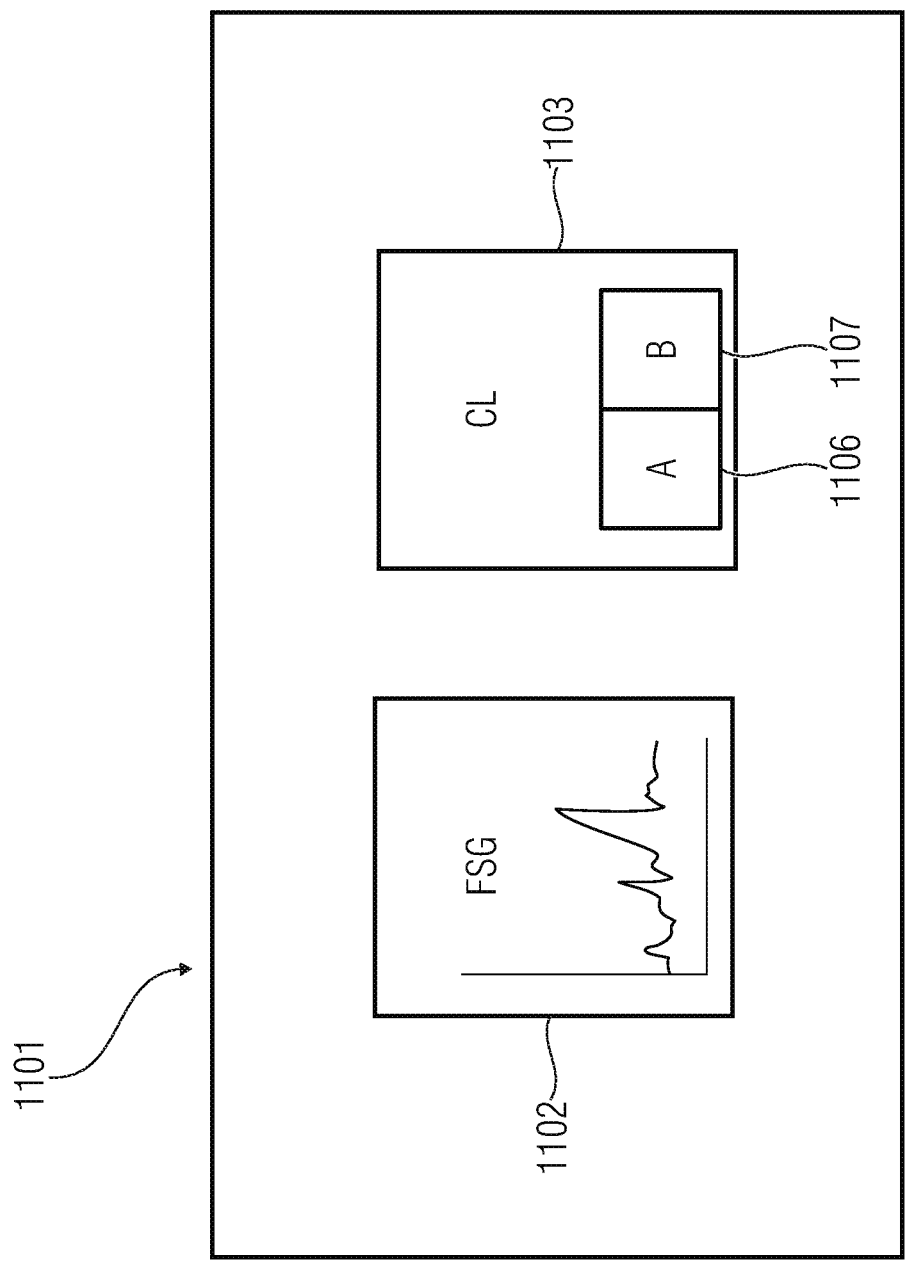
FIG. 1 is a block diagram of an inventive apparatus for mobile application.

FIG. 1 shows an inventive apparatus 1101 for mobile application. The apparatus 1101 comprises a frequency spectrum generator 1102 and a classifier 1103.

The frequency spectrum generator 1102 is configured to receive the radio waves and at least part of the radio waves existing at a current position of the apparatus 1101, respectively.

The frequency spectrum generator 1102 detects the respective frequencies and frequency portions, respectively, of the received radio waves and generates a frequency spectrum therefrom, wherein at least one of these frequencies and at least one of the frequency portions, respectively, exists. Thus, the frequency spectrum generator 1102 generates a position-specific frequency spectrum comprising the frequencies of signals received there.

The classifier 1103 classifies the generated frequency spectrum. For this, the classifier 1103 analyzes the frequency spectrum as regards to the signal characteristic, for example as regards to reception of radio waves of specific frequencies and/or specific signal strength. In other words, the classifier 1103 is configured to analyze a generated frequency spectrum according to whether, and possibly at what intensity, specific frequencies occur in this generated frequency spectrum.

The classifier 1103 classifies a generated frequency spectrum into one of at least two different classes 1106, 1107. The classification, i.e., the classification and allocation of a frequency spectrum into a specific class 1106, 1107 is performed in dependence on the above-described analyzed signal characteristic.

Figure 2:
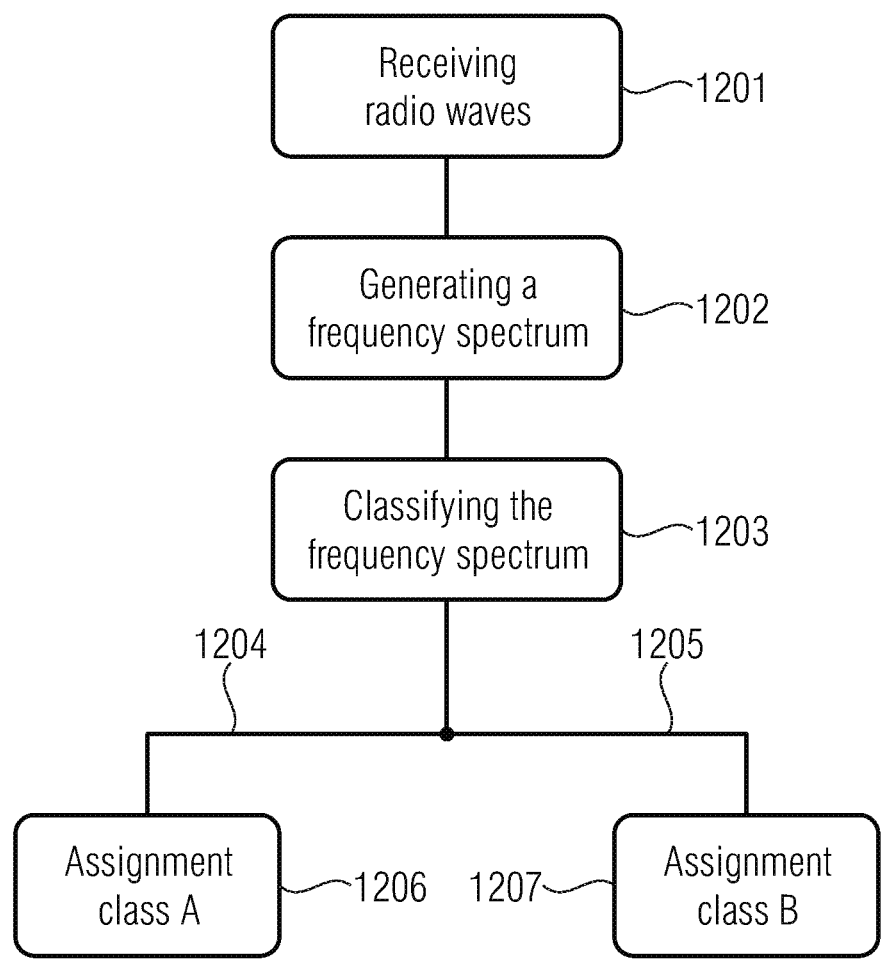
FIG. 2 is a block diagram of an inventive method for operating an apparatus for mobile application.

FIG. 2 shows the inventive method for operating an apparatus 1101 for mobile application. First, in block 1201, the radio waves existing at a position and at least part of the radio waves existing there, respectively, are received.

According to block 1202, a frequency spectrum is generated therefrom. This frequency spectrum includes at least one of the frequencies of the received radio waves.

The frequency spectrum is classified in block 1203. The embodiment in FIG. 2 comprises two classes A and B. In path 1204, the frequency spectrum is classified into class A. Thus, according to block 1206, in that case, assignment of the generated frequency spectrum to class A takes place.

In path 1205, the frequency spectrum is classified into class B. Thus, according to block 1207, in that case, assignment of the generated frequency spectrum to class B takes place.

Figure 3:
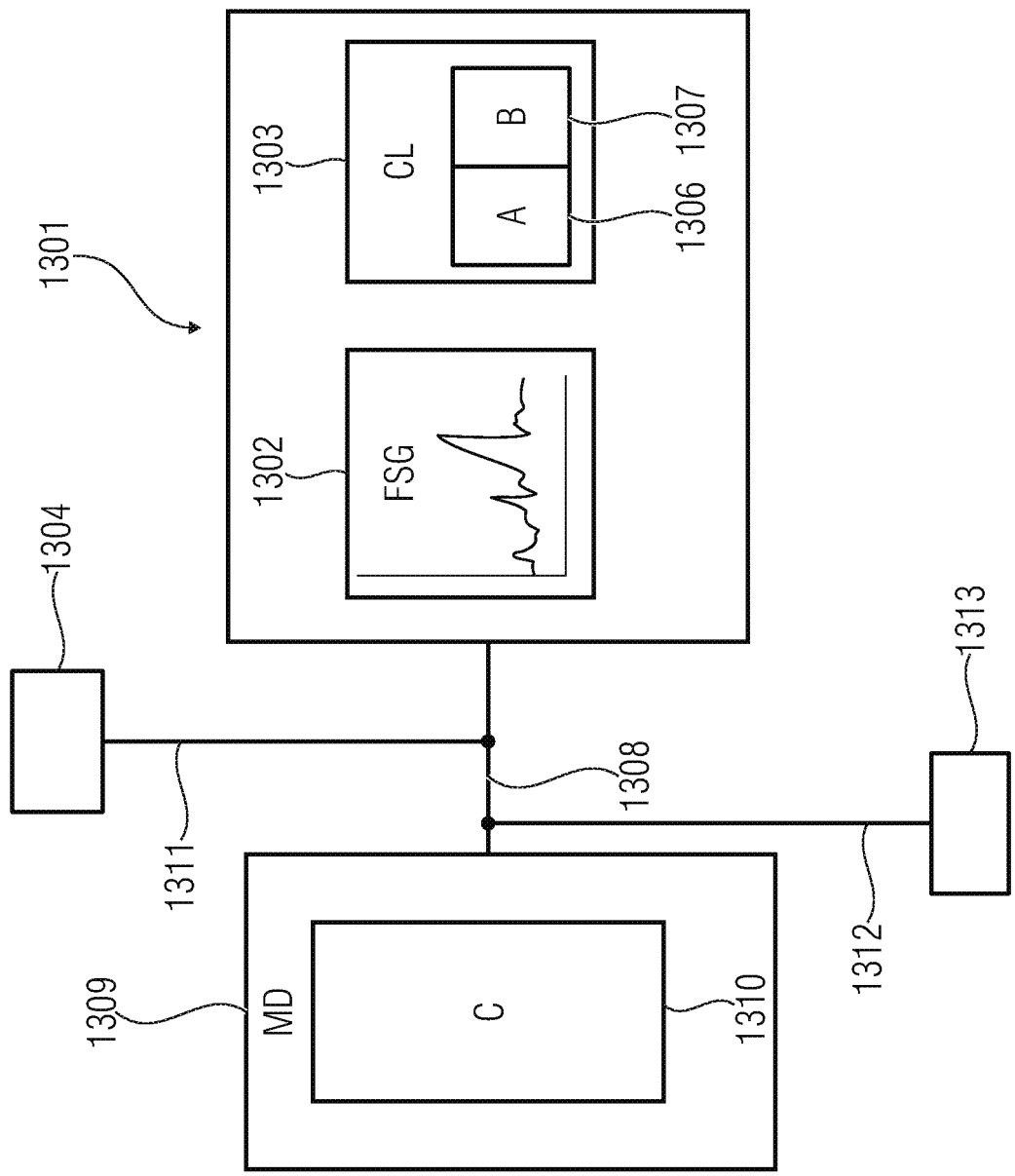
FIG. 3 is a block diagram of an inventive apparatus connected to a mobile device.

FIG. 3 shows a mobile device 1309 with an inventive apparatus 1301 for mobile application. The apparatus 1301 is connected to the mobile device 1309 via an interface 1308. The mobile device 1309 comprises at least one component 1310. The component 1310 can be operated in a first and a second operating state. The inventive apparatus 1301 is configured to control the at least one component 1310 and to control the mobile device 1309, respectively, which again controls the component 1310.

The apparatus 1301 comprises a frequency spectrum generator 1302 corresponding essentially to the frequency spectrum generator 1102 described with reference to FIG. 1 as regards to structure and function.

Further, the apparatus 1301 comprises a classifier 1303 which also corresponds essentially to the classifier 1103 described above with reference to FIG. 1. The classifier 1303 is configured to classify a generated frequency spectrum, wherein the classifier 1303 classifies the frequency spectrum into one of the two classes A 1306 or B 1307.

Depending on what class 1306, 1307 the classifier 1303 has classified the frequency spectrum into, the apparatus 1301 controls the mobile device 1309 such that the component 1310 is operated in the first or in the second operating state.

Figure 4:
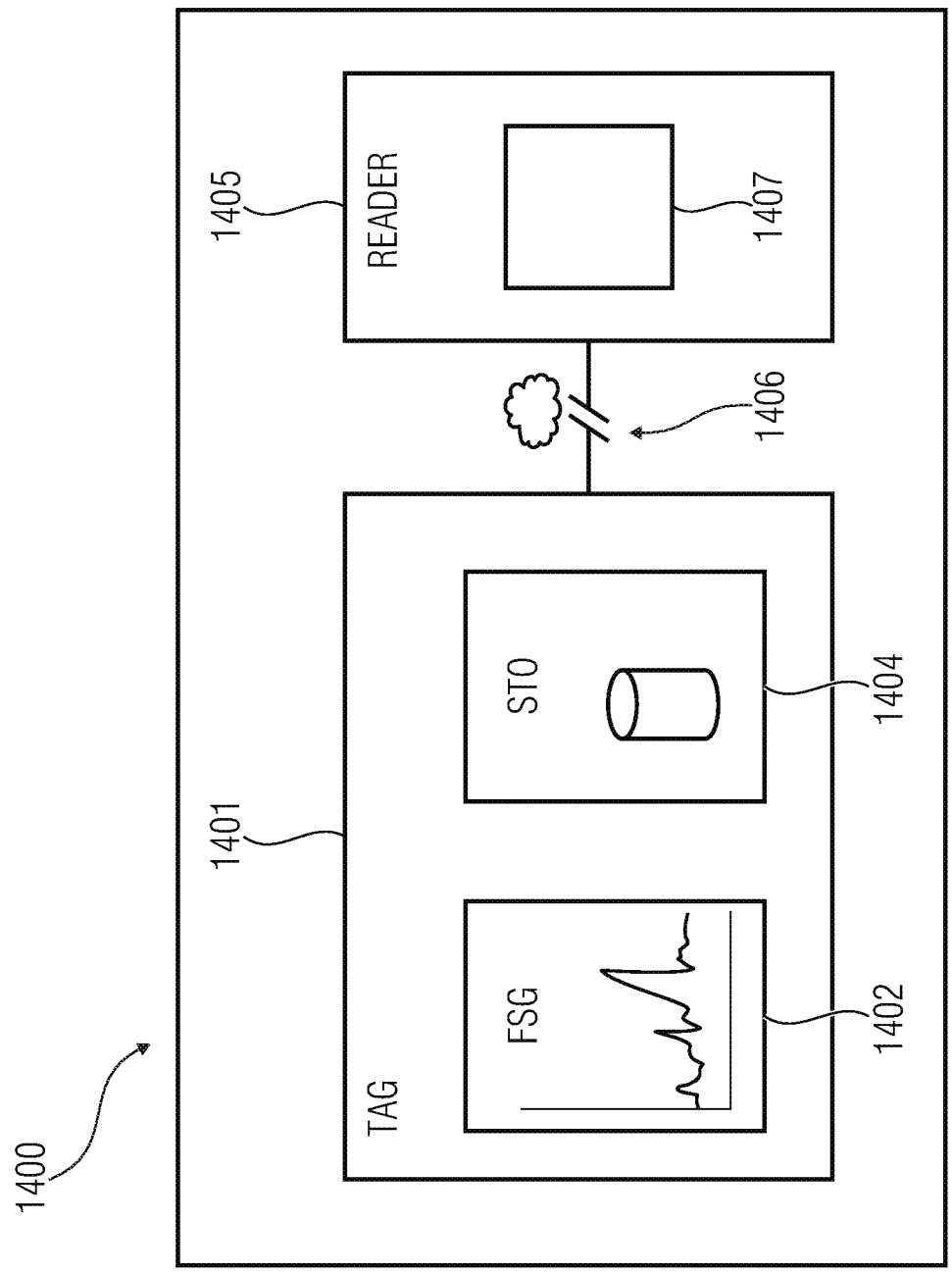
FIG. 4 is a block diagram of an inventive system having a tag, a memory and a tag reader.

FIG. 4 shows an inventive system 1400 with a tag 1401. The tag 1401 comprises a frequency spectrum generator 1402 essentially corresponding to the frequency spectrum generator 1102 described above with reference to FIG. 1 as regards to structure and function.

The system 1400 comprises a memory 1404 for storing a frequency spectrum. The memory 1404 can store several frequency spectra generated at different generation times.

The system 1400 comprises a tag reader 1405, also called tag reading device. The tag reader 1405 is configured to read out the tag 1401 and the memory 1404 of the tag 1401, respectively.

Further, the tag reader 1405 is configured to derive position information of the tag 1401 at a time at or between the generation times of a frequency spectrum. For this, the tag reader 1405 analyses the generated frequency spectrum/spectra read out from the memory based on the signal characteristic, for example, based on a reception of radio waves of specific frequencies and/or with specific signal strength. In other words, the tag reader 1405 examines a generated frequency spectrum with regard to whether and possibly at what intensity certain frequencies have occurred in this generated frequency spectrum at the time of generation.

The tag reader 1405 can derive the position information from the individual frequency spectra, i.e., position information can be allocated to each frequency spectrum generated at a specific time. The tag reader 1405 can derive position information also from a time period lying between two generation times. In this case, such position information can also include estimation of the velocity by which the tag 1401 has moved between two considered generation times.

The tag 1401 is portable and for the application the same can be attached to subjects, e.g., for identifying those subjects. A tag 1401 is an apparatus for mobile application.

According to the embodiment illustrated in FIG. 4, the tag reader 1401 is configured within the system 1401 as a unit separate from the tag 1401. The tag reader 1405 can include a classifier for classifying the data read out from the memory 1404 of the tag into different classes. Such a classifier would be an external classifier as described above.

The tag reader 1405 is connected to the tag 1401 via an interface 1406. The interface 1406 can be a wireless interface. The tag reader 1405 can communicate with tag 1401 via the interface 1406, i.e., data such as data relating to the frequency spectra stored in the memory 1401 can be exchanged between tag 1401 and tag reader 1405 via the interface 1406 in a unidirectional or bidirectional manner.

The tag reader 1405 can comprise a display apparatus 1407. Readout data, among others the generated and stored frequency spectra can be displayed to the user via this display apparatus 1407.

In the following, the mode of operation will be discussed in more detail based on some examples illustrated in FIGS. 5 to 13.

Figure 5:
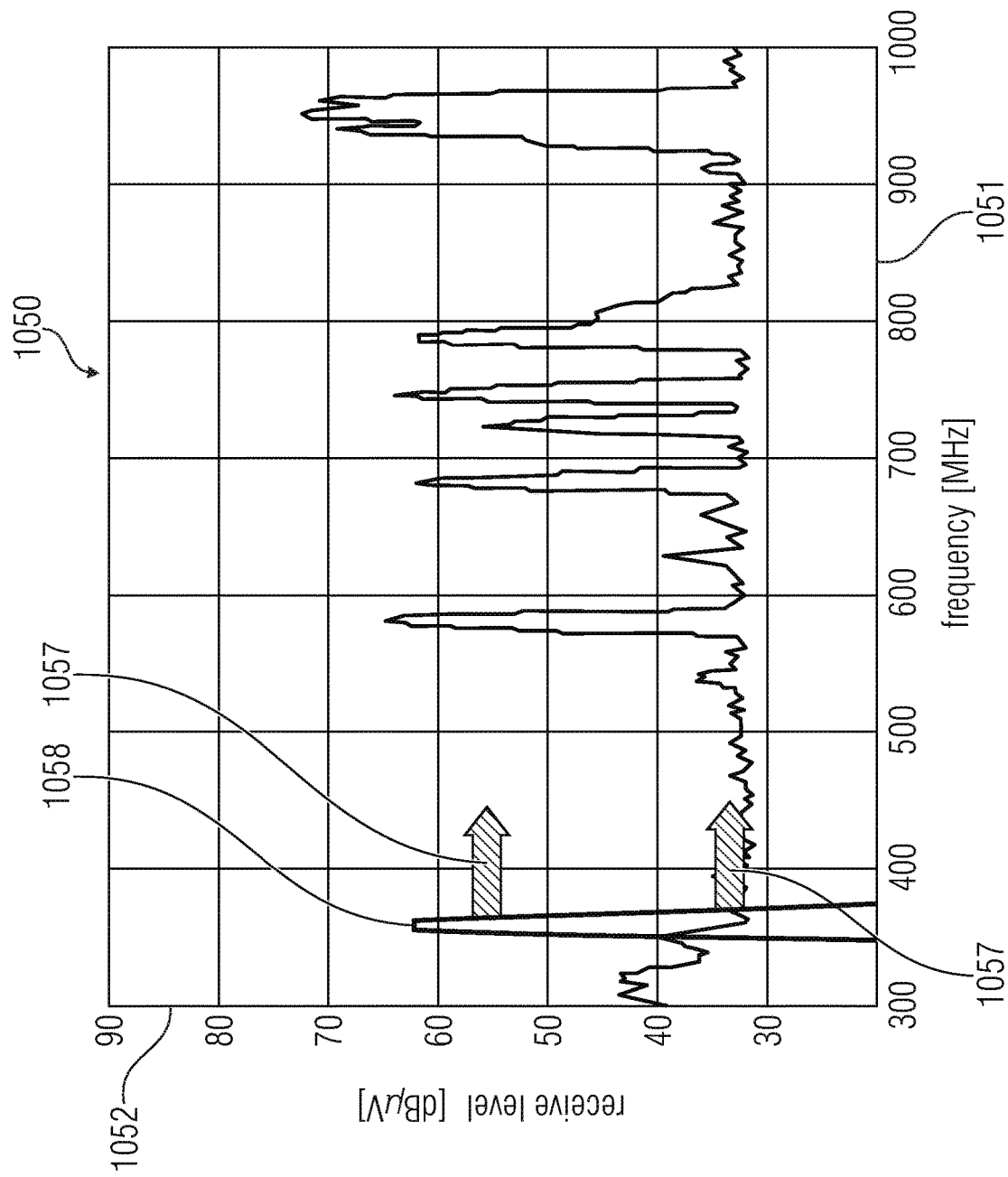
FIG. 5 is an example for a continuous frequency spectrum generated with the inventive apparatus.

FIG. 5 shows exemplarily a diagram 1050 of a continuous frequency spectrum as it can be generated with a frequency spectrum generator 1102. For this, the frequency spectrum generator 1102 is configured, among others, as broadband radio receiver, e.g., as a radio scanner. A frequency band having frequencies from 300 MHz to 1000 MHz is plotted on the abscissa 1051 of the diagram 1050. Signal levels of 0 to 90 dBµV are plotted exemplarily on the ordinate 1052.

For generating the continuous frequency spectrum, at least one frequency sweep 1058 is performed, wherein a scan of radio waves and radio signals within the frequency band (here 300 MHz to 1000 MHz) existing at the current position of the inventive apparatus 1101 is performed. The frequency sweep 1058 is performed from low to high frequencies, illustrated by the directional arrows 1057.

Detecting the frequency spectrum of actually existing radio waves can be performed continuously, wherein the frequency spectrum generator 1102 working as radio scanner scans the position of the apparatus 1101 either continuously or intermittently for radio waves. In the latter case, the frequency spectrum generator 1102 scans the frequency spectrum several times in specific temporal intervals which can vary.

The frequency spectrum generator 1102 configured as radio scanner is a very energy-efficient radio scanner. The frequency spectrum generator 1102 can, for example, be configured as a sampling superheterodyne receiver with a tunable local oscillator for performing a frequency sweep.

The switch-on period of the frequency spectrum generator 1102 is some magnitudes shorter than the sampling period. The switch-on period can, for example, be approximately 100 ns and sampling period can be approximately 100 µs. With an ON current of 10 mA, an average sampling receiver current consumption of 10 µA results, calculated from ON current times switch-on period divided by sampling period $$\left(\frac{10 \text{ mA} \cdot 100 \text{ ns}}{100 \text{ µs}} = 10 \text{ µA}\right).$$

The frequency spectrum generator 1102 configured as radio scanner can also be configured as a super-regenerative receiver with tunable receiver oscillating circuit for performing a frequency sweep. Such a frequency spectrum generator 1102 and radio receiver, respectively, can operate with current consumptions below 400 µA.

When needed, the frequency spectrum generator 1102 configured as radio scanner offers a high update rate, e.g., every 10 ms (up to 100 times/second). Here, the update rate can be selected variably.

Apart from the storage of raw data, the frequency spectrum generator 1102 configured as radio scanner enables also the storage of statistically processed data with greater memory length (e.g., 10 seconds, 10 minutes or 1 hour).

Figure 6:
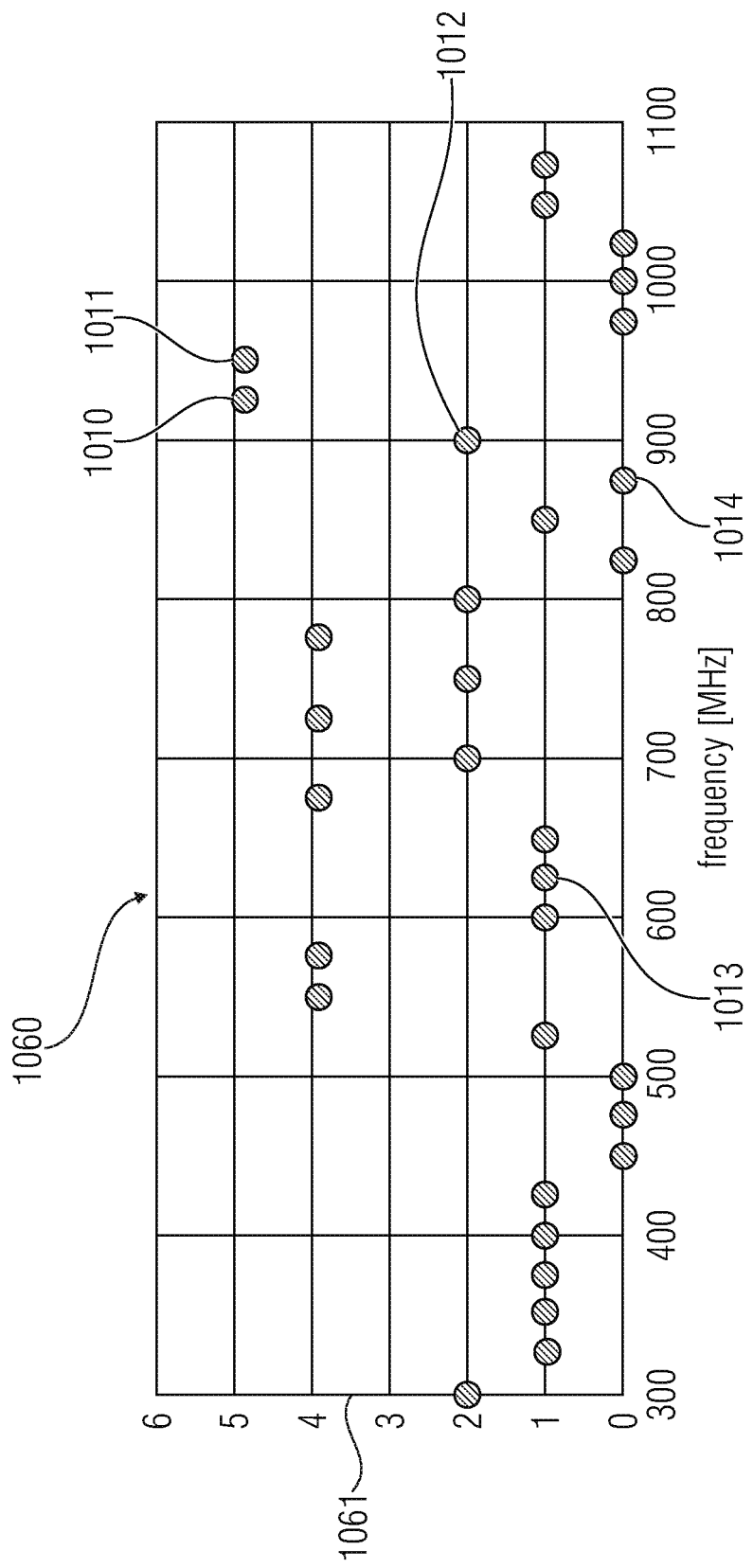
FIG. 6 is a discretized frequency spectrum based on the example of a frequency spectrum characteristic for an open space.

Further, the frequency spectrum generator 1102 is configured to discretize and quantize the continuous frequency spectrum illustrated in FIG. 5. FIG. 6 shows exemplarily a discretized frequency spectrum illustrated in a spectrogram 1060. For discretization, a continuous frequency spectrum, as discussed with reference to FIG. 5, is detected intermittently or continuously and quantized with a specific frequency raster and a specific amplitude resolution and in that way mapped by a finite number of points, e.g., in a discretized spectrogram 60 illustrated in FIG. 6. The bandwidth per frequency point can be designed variably.

FIGS. 6 to 10 show different discretized frequency spectra, illustrated in one spectrogram each within a frequency band between 300 MHz and 1100 MHz. The values of the discrete frequencies are plotted on the abscissa of the respective spectrogram. The values of the amplitude and the signal levels, respectively, are plotted on the ordinate of the respective spectrogram, exemplarily in a range from 1 to 6.

The inventive apparatus 1101 classifies each of the frequency spectra discussed exemplarily in FIGS. 6 to 10 into a specific class. In the present embodiment, on a semantic level, a class is a specific position, in the following also called a scenario.

The spectrogram 1060 shown in FIG. 6 shows a frequency spectrum with a distribution of discrete frequencies as it can be characteristic for an open outdoor space.

Figure 7:
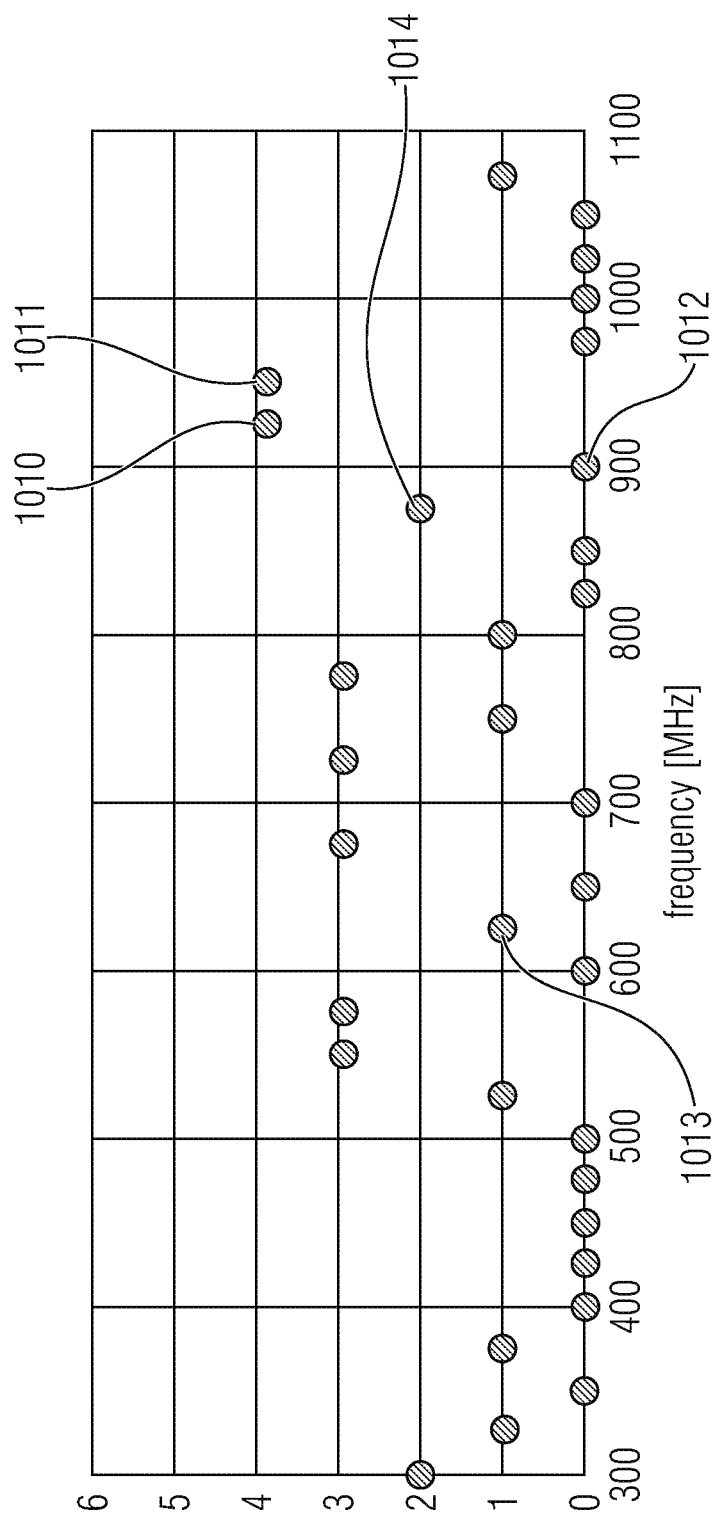
FIG. 7 is a discretized frequency spectrum based on the example of a frequency spectrum characteristic for an interior room.

The spectrogram illustrated in FIG. 7 shows a frequency spectrum with a distribution of discrete frequencies as it can be characteristic for the interior of a building.

The classifier 1103 of the apparatus 1101 classifies the frequency spectrum illustrated in FIG. 6 into the class "outdoor" and the frequency spectrum illustrated in FIG. 7 into the class "indoor".

If the inventive apparatus 1101 changes its position, for example from outdoor to the interior of a building, this will normally also change the measured frequency spectrum accordingly. In this case, it is expected that the levels generally become smaller. Individual levels, such as WLAN, can also become greater.

Still with reference to FIGS. 6 and 7, these changes of levels of the discrete frequencies are to be illustrated. Outdoors, according to FIG. 6A, a discrete frequency 1010 having a value of approximately 930 MHz as well as a discrete frequency 1011 having a value of approximately 950 MHz both have a signal level of 5 on the ordinate 1061. Indoors, according to FIG. 7, the respective levels of the discrete frequencies 1010, 1011 fall by an entire unit, i.e., a drop by an entire unit, i.e., to a value of 4.

Outdoors, according to FIG. 6, a discrete frequency 1012 having a value of approximately 900 MHz comprises a signal level of 2 on the ordinate. Indoors, according to FIG. 7, the level of the discrete frequency 1012 drops by two units, i.e., to a value of 0.

Outdoors, according to FIG. 6, a discrete frequency 1013 with a value of approximately 630 MHz comprises a signal level of 1 on the ordinate 1061. Indoors, according to FIG. 7, this level of the discrete frequency 1013 remains unchanged.

Outdoors, according to FIG. 6, a discrete frequency 1014 with a value of approximately 870 MHz comprises a signal level of 0 on the ordinate 1061. Indoors, according to FIG. 7, the level of the discrete frequency 1014 increases by two units, i.e., to a value of 2.

Figure 8:
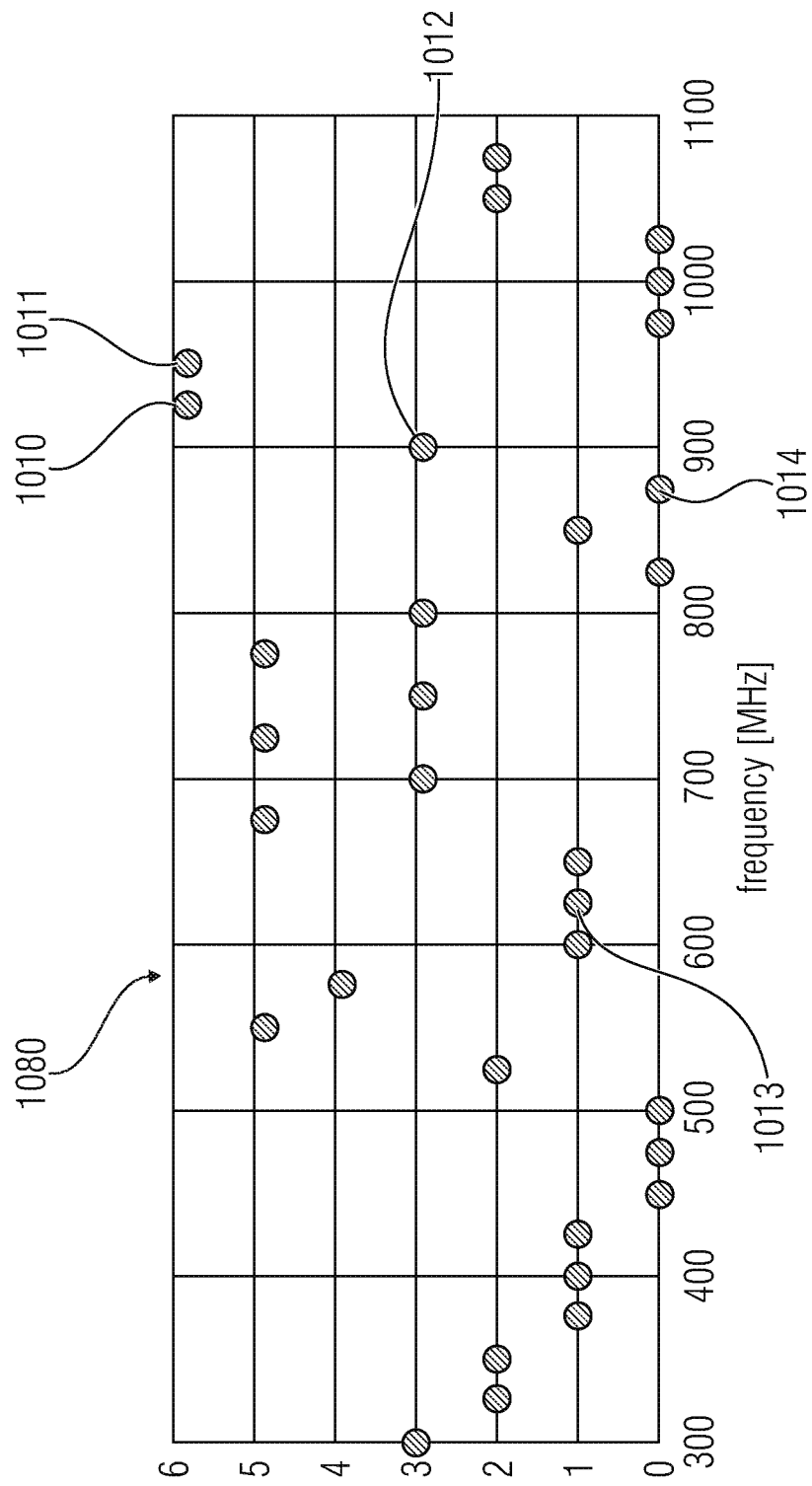
FIG. 8 is a discretized frequency spectrum based on the example of a frequency spectrum characteristic for a top floor.

FIG. 8 shows a further spectrogram 1080 of a generated frequency spectrum which can be characteristic for higher locations, such as on a higher floor, on a top floor or in the attic of a building. The classifier 1103 of the apparatus 1101 classifies this frequency spectrum, for example, into class "roof". Due to the generally more favorable reception situation at such higher positions, the respective levels of the discrete frequencies in FIG. 8 are to a large part higher than the levels figured or imaged in FIG. 6, which indicate a lower open space.

Figure 9:
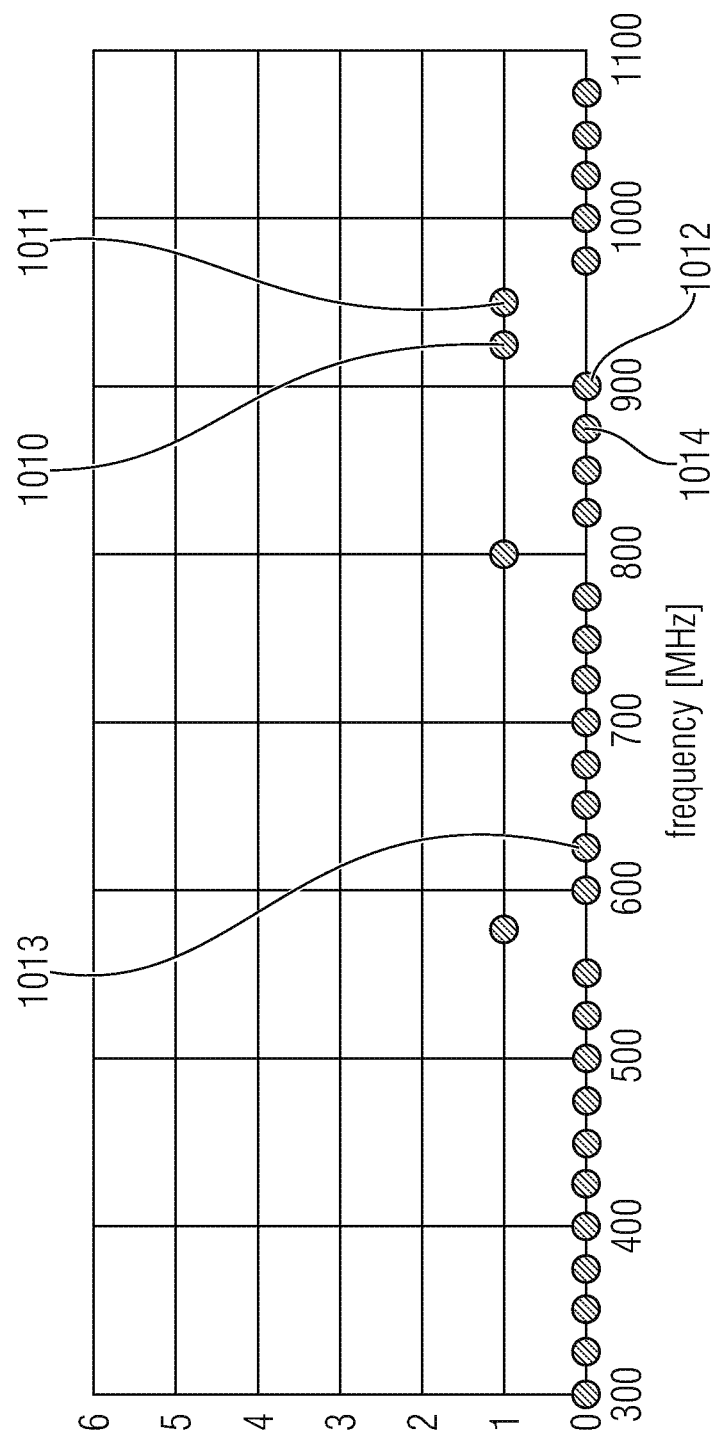
FIG. 9 is a discretized frequency spectrum based on the example of a frequency spectrum characteristic for an underground parking garage.

FIG. 9 shows a further spectrogram of a frequency spectrum which can be characteristic for positions with bad network coverage, such as a basement room or an underground parking garage of a building. The classifier 1103 of the apparatus 1101 classifies this frequency spectrum, for example, into the class "underground parking garage". The respective levels of the discrete frequencies in FIG. 9 are to a large part lower than the levels shown in FIGS. 6, 7 and 8, which indicate better reception situations.

Figure 10:
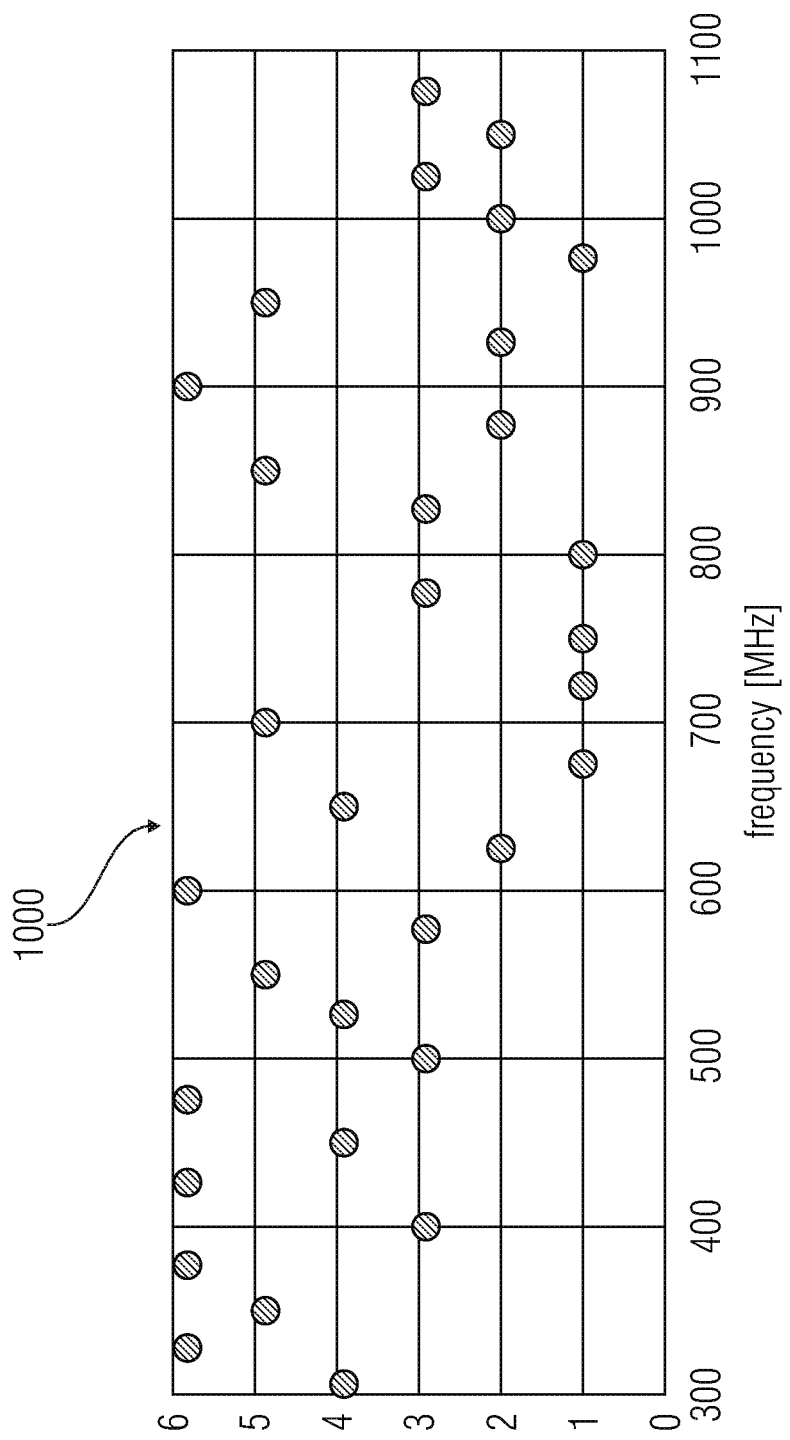
FIG. 10 is a discretized frequency spectrum for the example of a frequency spectrum characteristic for a vehicle interior.

In specific environments, characteristic interferers can be used for classifying the frequency spectra. FIG. 10 shows, exemplarily, a frequency spectrum in a spectrogram 1000, which can be characteristic for a high-speed train. Characteristic interferences occurring herein can be used, apart from the time course of the spectrum, to classify such environments. Characteristic interferers that can be characteristic for a stay on a train are, for example, the peaks of the discrete frequencies in the range between 300 MHz and 500 MHz occurring in the spectrogram 1000 shown in FIG. 10. The classifier 1103 of the apparatus 1101 classifies this frequency spectrum, for example into the class "train".

As shown in FIGS. 6 to 10, the frequency raster can be equidistant. For the purpose of the inventive method, the frequency raster does not have to be equidistant. The same can be fragmentary and does not have to be swept in a continuous or linear manner but can also be swept arbitrarily.

The order of sampling the discrete frequencies 1010, 1011, 1012, 1013, 1014 between a first and second sampling process can vary, i.e., sampling does not have to be performed linearly from low to high frequencies or vice versa. Sampling can be performed, for example, within the frequency band from the outside to the inside, i.e., starting from the left and right limits of the frequency band in equidistant or varying steps towards the inside to an average value of the frequency band. Sampling can also be performed in reverse order, i.e., from the inside to the outside. As already mentioned, the sampling order can also be selected arbitrarily. Such non-linear and non-equidistant sampling orders are advantageous in that aliasing effects when obtaining a spectrogram can be suppressed.

The classification of the detected frequency spectra into the respective classes and the classification into different scenarios in connection therewith can be performed differently. In one embodiment, the classifier 1103 performs classification based on the signal levels and a simple level threshold. As mentioned with reference to FIGS. 6 to 10, each discrete frequency has a specific level value between 0 and 6. If, for example, a level threshold of 1.50 is fixed for the above-mentioned discrete frequencies 1010, 1011, 1012, the levels of the discrete frequencies 1010, 1011, 1012 exceed this threshold in the spectrogram 1060 shown in FIG.

6. Accordingly, the classifier 1103 can classify this frequency spectrum into the class, e.g., "outdoor".

In FIG. 9, however, the levels of the discrete frequencies 1010, 1011, 1012 fall below the above defined threshold of 1.50. Accordingly, the classifier 1103 can classify this frequency spectrum into the class, e.g., "underground parking garage".

It would also be possible to use accumulated levels for the classification into different classes. Thus, it can, for example, be determined that a frequency spectrum is assigned to a specific class when a selection of a specific number of discrete frequencies has reached or exceeded a defined receive level, e.g., when at least 20 of 50 frequency points have a defined receive level of at least −50 dBm.

However, also a level threshold for firmly defined frequencies can be used for classification. That way, it can be determined, for example, that a frequency spectrum is assigned to a specific class when a receive level threshold of a specific radio station for radio and television, of specific BOS radio services, private mobile radio services, aircraft radio or the same is reached or fallen below or exceeded.

Minimum, maximum, average values over a defined time period are suitable, for example, for energy-saving statistic processing. The variance of the average value is also suitable for data processing. By storing the statistically processed values (and possibly individual frequency values of interest) instead of all measured frequency points, the data amount to be stored can be reduced significantly, i.e., by several magnitudes.

Figure 11:
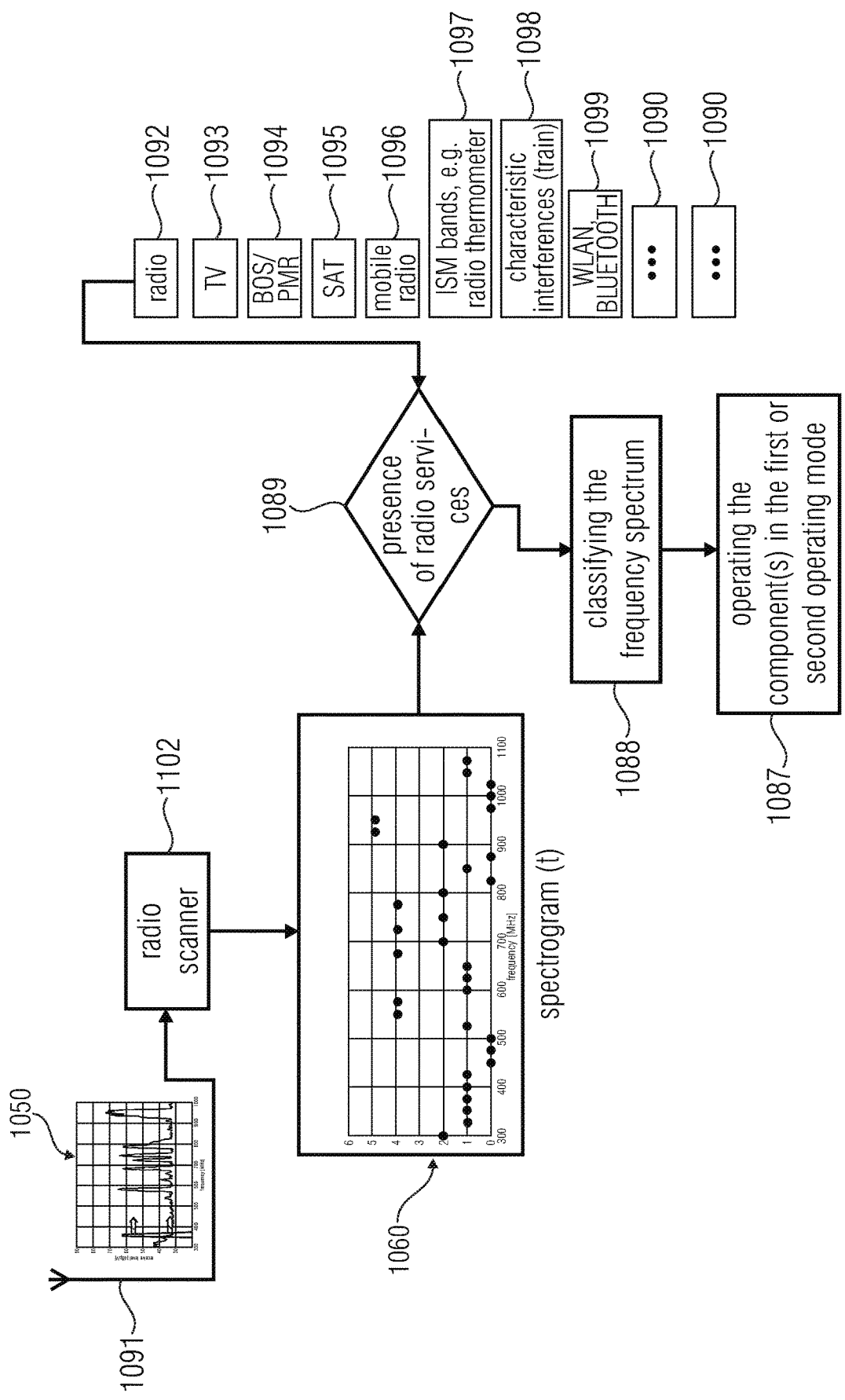
FIG. 11 is a schematic overview of an inventive apparatus.

FIG. 11 shows in summary the structure as well as the function of the inventive apparatus and the inventive method, respectively.

A frequency spectrum generator 1102 configured as radio scanner scans or searches for a current position of existing radio waves. In other words, within a limited environment and within a predetermined frequency band, the frequency spectrum generator 1102 scans the position for respective radio waves in order to detect the presence of radio services as shown in step 1089.

The frequency spectrum generator 1102 can use an antenna 1091 for this. The antenna 1091 can be connected to the frequency spectrum generator 1102. If the inventive apparatus is connected to a mobile device, the frequency spectrum generator 1102 can use the antenna 1091 incorporated in the mobile device.

With the help of the antenna 1091, the frequency spectrum generator 1102 scans a predetermined frequency band continuously or intermittently in order to detect the presence of radio waves existing at the current position. Thus, the presence of radio services 1089 existing at this position is detected. That way, the frequency spectrum generator 1102 scans, for example, for specific radio signals 1092, TV radio signals 1093, administrative radio signals (BOS/PMR) 1094, satellite radio signals (SAT) 1095, mobile radio signals 1096, radio signals in ISM bands 1097 such as radio thermometer, signals of characteristic interferers 1098, such as on a train, WLAN or Bluetooth 1099, as well as for possible further existing radio signals of other frequencies 1090.

The frequency spectrum generator 1102 can generate several subsequent frequency spectra to continuously or intermittently. When frequency spectra are generated intermittently, the same are generated in specific time intervals. The frequency spectra 1050 that are measured and generated, respectively, intermittently or continuously, which can be mapped, for example, in the form of discretized frequencies in spectrograms 1060, are evaluated as regards the presence of radio services and characteristic interferers, e.g., based on the level strength of a specific detected frequency.

First, the frequency spectrum generator 1102 generates a continuous frequency spectrum 1050 as shown in FIG. 5. Then, the frequency spectrum generator 1102 generates a discretized frequency spectrum 1060 as discussed with reference to FIGS. 6 to 10.

In the following step 1088, the frequency spectra generated by the frequency spectrum generator 1102 are classified by the classifier 1103, i.e., the same are classified in different classes or scenarios.

If an inventive apparatus is connected to a mobile device, in an optional step 1087, the mobile device 1309 can be controlled such that components 1310 existing therein are operated in a first or in a second operating mode in dependence on the selected class.

Such an embodiment will be discussed in more detail with reference to FIG. 3. Here, the inventive apparatus 1301 for mobile application is connected to a mobile device 1309. Depending on the respectively assigned class, the apparatus 1301 controls the mobile device 1309 such that the at least one component 1310, such as a WLAN module, is operated in a first or in a second operating state.

In some environments and situations, respectively, it can happen that specific functions of the mobile device 1309 cannot be used or can only be used to a limited extent. If the inventive apparatus 1301 generates, for example, a frequency spectrum that can be compared to the frequency spectrum shown in FIG. 9 (e.g., "underground parking garage"), frequently, no or at least only limited, mobile communication is possible. Thus, the inventive apparatus 1301 can control the mobile device 1309 such that the mobile radio modem is switched off. As soon as the frequency spectrum generator 1102 determines a different environment, i.e., a different characteristic frequency spectrum, such as shown, for example, in FIGS. 6, 7 and 8, the mobile radio modem is switched on again. This would, for example, be the case when the inventive apparatus 1301 leaves the underground parking garage again.

Accordingly, the inventive apparatus 1301 and the inventive method, respectively, can be used for estimating the current position and the type of environment, respectively, in a mobile device 1309 based on the frequency spectrum measured and generated by evaluating the existing radio services and/or interferences. This information can then be used to place at least one component 1310 in the mobile device 1301 into a selected operating state according to the needs and/or depending on the environment.

A selected operating state can therefore be a selection of a specific operating state of a component 1310, such as a radio module, adapted to needs and/or environment. If, for example, the network coverage prevailing at a position is not sufficiently high to use the respective radio service, this radio service, as mentioned above, can be switched off or the respective radio module can be placed in an energy-saving mode or can be deactivated.

For this, the apparatus 1301 can interact with the energy and resource management of the mobile device 1309 or can place a component 1310 into an operating state with low energy consumption by user-specific selection, or can switch the component 1310 on and off, respectively.

This offers the option of realizing the inventive apparatus 1301 with low energy consumption. Such a realization can advantageously be performed such that the entire energy consumption of the apparatus 1301 is lower than the energy consumption of the at least one component 1310 in a non-class related operation. In other words, by controlling at least one component 1310 of the mobile device 1309 based on the needs, more energy than needed by the inventive apparatus 1301 itself is saved. This means, when the inventive apparatus 1301 is connected to a mobile device 1309, energy saving by class-specific control (e.g., selective switching on/off) of the component 1310 is higher than the energy consumption of the inventive apparatus 1301 connected to the mobile device 1309. For voltage supply, the inventive apparatus 1301 can fall back on the accumulator of the mobile device 1309. Despite the voltage supply of the apparatus 1301, the accumulator of the mobile device 1309 lasts longer, since the energy saving by the inventive class specific control of the component 1310 is higher than the current consumption for continuous operation of the component 1310.

As already mentioned, a specific class and a specific scenario, respectively, can represent a position. This is to be described in more detail based on the example of the scenario "homezone", where the user of a mobile device 1309 connected to an inventive apparatus 1301 enters his home.

First, the user of the mobile device 1309 is on the street in front of his house. The frequency spectrum prevailing there is detected by the frequency spectrum generator 1302 and classified, for example, as class "outdoor". If the user enters his house, the apparatus 1301 detects this as follows.

First, the frequency spectrum generator 1302 detects the frequency spectrum prevailing in the house. The frequency spectrum has characteristics that are characteristic for the position "at home". For example, WLAN networks, radio thermometer signals and further signals from the radio devices "at home" are received. Based on the above-described classification methods (signal level, level threshold, etc.), this characteristic frequency spectrum is classified into the class "homezone". Thus, the apparatus 1301 "detects" the current position as the home of the user.

The apparatus 1301 controls the mobile device 1309 such that the components 1310 existing in the mobile device 1309 are operated in a class-dependent operating state. In that way, in the class "homezone" previously activated components 1310, such as the GPS receiver and the navigation system can be switched off and other previously deactivated components 1310, such as the WLAN module, can be switched on. However, the components 1310 can also remain in the same operating state, for example, a Bluetooth module which can be used both inside and outside the "homezone".

Advantageously, the apparatus 1301 has an interface 1311 to a display apparatus 1304. Alternatively or additionally, the inventive apparatus 1301 can use the display of the mobile device 1309 for displaying information.

A frequency spectrum generated at a current or earlier time can be displayed to the user via the display apparatus 1304. If a frequency spectrum has already been classified by the classifier 1303, the respective class can be output at the display apparatus 1304.

Additionally, the apparatus 1301 can comprise an input interface 1312 for connection with an input apparatus 1313. Alternatively or additionally, the inventive apparatus 1301 can use the input apparatus, such as the touch screen unit at the mobile device 1309. Via this input apparatus 1313, the user can classify a generated frequency spectrum. In that way, the user can classify, for example, a frequency spectrum generated at home into a class "homezone", a frequency spectrum generated at an airport into a class "airport", etc.

Generally, different scenario-dependent actions can be executed at the mobile device 1309. Depending on the respective class determining the respective scenario, radio services, such as GPS/GNSS, can be switched on and off. The display brightness can be adapted, such that, for example, in a living room the brightness is refused while in an underground parking garage the brightness is increased. A longer stay in the underground parking garage is detected based on the time course of the frequency spectrum and the brightness of the display can be reduced again. Telephone profiles can also be adapted in dependence on the class, such that, for example, all ring tones are muted when entering a cinema hall.

In a further embodiment, radio signals can be used for inferring the region where the apparatus 1301 currently is. Generally, different regions have different frequency occupancy schemes. In that way, the station occupancy of the radio band in Greater Munich differs from the station occupancy in Greater Nuremberg.

Thus, generally, the inventive apparatus 1101, 1301 can estimate an environmental class by spectral evaluation of the measurement data and spectrograms, respectively. The environmental class can be estimated by a comparison with defined scenario patterns. Possible environmental classes are, for example:

Indoors (e.g., "homezone")
Outdoors (again to be differentiated in rural or urban environment)
In the car
On the underground
On the train
On an airplane
At the airport This differentiation can also be based on simple rules, e.g., level thresholds, frequency intervals, etc. The evaluation can also be performed based on statistically processed data.

Apart from the above-described classification into classes representing a position, such classes can also represent a velocity of movement of the apparatus 1101.

By evaluating the time course of the generated frequency spectra and spectrograms, respectively, fading or shading can be used in a practical manner in order to react to specific environment and movement scenarios, such as entering a skyscraper, driving with the lift and the same and to determine velocities of moveable transmitters or of a carrier of a transmitter for the inventive apparatus 1101. Then, as described in more detail below, a velocity of movement of the inventive apparatus 1101 can be estimated from the detected frequency spectra.

Figure 12:
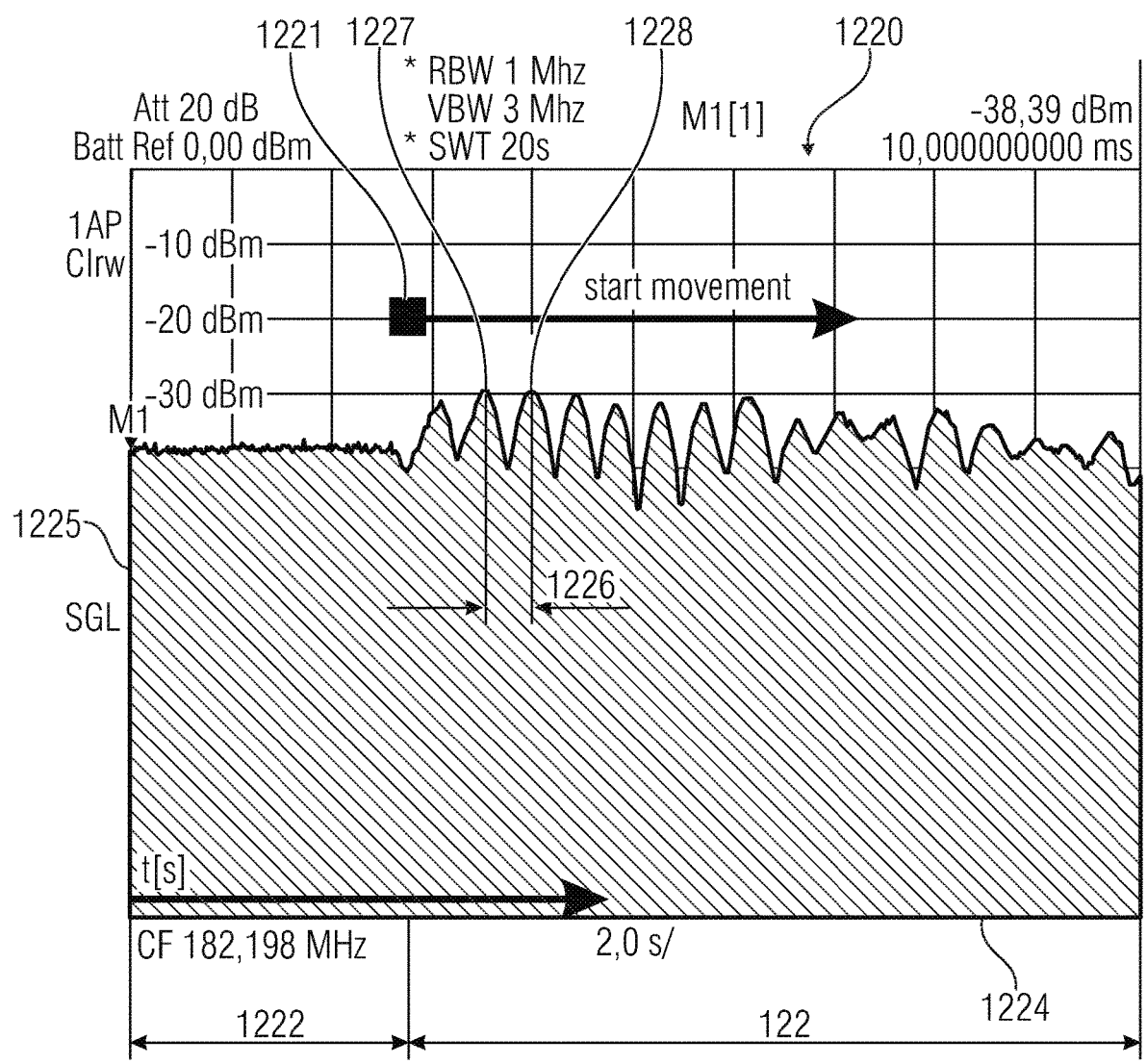
FIG. 12 is a frequency spectrum recorded during a movement of the inventive apparatus.

FIG. 12 shows a frequency spectrum 1220 generated continuously by an inventive apparatus 1101 at a considered frequency of 182.198 MHz for that purpose. The time course is plotted in seconds on the abscissa 1224. The receive level is plotted in dBm on the ordinate 1225.

The frequency spectrum 1220 comprises a first portion 1222 and a subsequent second portion 1223. The second portion 1223 starts from the time 1221 where a movement of the apparatus 1101 takes place.

In the first portion 1222, the signal strength and the level of the received signal, respectively, is at an approximately constant value of −38 dBm (i.e., comprising a slight background noise). In the second portion 1223, the received level varies at an equal interval 1226 of approximately 0.95 s between approximately −30 dBm and approximately −46 dBm. In the present embodiment, the distance 1226 can be considered as the time distance between the two maxima 1227 and 1228. This variation of the received level is also referred to as pulsing.

Pulsing spectral lines of a fixed frequency (e.g., in the TETRA-BOS radio system at 380 MHz to 395 MHz, which is well developed in Germany) can be used for estimating the velocity, for example in the urban area, where reflecting or absorbing objects (houses, lampposts, traffic lights, trucks, containers, etc.) exists. By the partial deletion of arriving and reflected radio waves at a frequency $f_{RX}$ during multipath fading, the velocity of the receiver can be estimated starting from the time period Δt between two adjacent reference points (minima, maxima, zero crossings, etc.). Assuming that the reference points are located at the distance $$\frac{\text{Wavelength}(\lambda)}{2}\left(\frac{\lambda}{2}\right),$$

the following applies, $$\Delta s = \frac{\lambda}{2} \text{ as well as } c = \lambda \cdot f_{RX}$$

for the velocity $$v = \frac{\Delta s}{\Delta t} = \frac{\lambda}{2 \cdot \Delta t} = \frac{c}{2 \cdot \Delta t \cdot f_{RX}} \qquad [a]$$

In this regard, FIG. 12 shows a measured receive level curve (in dBm) of a public radio signal at approximately 182 MHz in front of a three-story office building. The frequency spectrum generator, and the measuring device operating as radio receiver, respectively, (spectrum analyzer with recording in the time domain) had been moved with constant velocity for 15 m in a walking manner starting from t=5 s (illustrated by point 1221). Thus, by applying equation [a], a velocity of approximately 0.9 m/s can be determined.

Thus, in this embodiment, the velocity of movement of the apparatus 1101, 1301, 1401 is calculated according to equation [a] based on the signal strength of the frequency spectrum 1220 at at least one of the mentioned frequencies of 182.198 MHz at subsequent detection times. For performing this calculation, the inventive apparatus 1101, 1301, 1401 comprises a computer.

According to a further embodiment, based on the described evaluation and calculation of frequency spectra, respectively, the inventive apparatus 1301 can detect a movement of a car including the apparatus 1301 moving, e.g., with 30 km/h. Accordingly, the classifier 1303 of the apparatus 1301 classifies a frequency spectrum recorded in the vehicle into the class "vehicle".

When the inventive apparatus 1301 is connected to a mobile device 1309, the same can act accordingly and control the mobile device 1309 according to the class "vehicle". For example, the operating options of the mobile device 1309 can be limited or deactivated during the drive and voice-control or hands-free equipment can be activated. Thus, the mobile device 1309 is controlled in dependence on needs and an environment, which can, in this case, contribute to increasing road safety.

In one embodiment, the detected velocity can contribute to the estimation of the environment and the position (e.g., "vehicle") of an inventive apparatus 1101. The combination with possibly existing sensors, such as with a GPS module for refining the location estimation is also possible.

Both the above-described evaluation of frequency spectra according to formula [a] as well as general temporal variations in generated frequency spectra can be used for detecting velocities and/or different environments. Temporal variations of specific discrete frequencies and their signal strength, respectively, can indicate that the inventive apparatus 1101 moves between two specific locations. Thereby, tracking, i.e., following a covered path of the apparatus 1101 becomes possible.

Such tracking can be realized advantageously with the inventive system 1400. One embodiment will be described below with reference to FIG. 4.

The system 1400 comprises a tag 1401. The tag 1401 comprises a frequency spectrum generator 1402. The frequency spectrum generator 1402 generates a frequency spectrum prevailing at the respective generation time at different times.

The tag 1401 comprises a memory 1404. The respective frequency spectra, i.e., generated at different times, can be stored in the memory 1404.

The tag 1401 and the memory 1404 of the tag 1401, respectively, can be read out at the target location via an interface 1406, such as a wireless interface with the help of a tag reader 1405. By offline evaluation of the data (e.g., frequency spectra with time stamp) location information of the tag 1401 can be derived. In that way, important statements can be made on the positions and position times of the tag 1401. The inventive system 1400 is used, among others, in the logistics sector for optimizing logistics process.

If, for example, a container on a cargo ship having such a tag 1401 on each cargo is used, a different characteristic frequency spectrum is detected in the starting harbor (e.g., New York) than at sea (spectrum includes almost no signal portions, possibly only on-board communication of the ship). When arriving in the target harbor (e.g., Hamburg) the tag 1401 will detect the characteristic spectrum prevailing in Hamburg and generate a respective frequency spectrum and spectrogram, respectively: for example, DAB and DVB-T radio signals 1090, 1092, 1093, TETRA signals (BOS) 1094, GSM900 1096.

If a container provided with a tag 1401 is placed in the center of the ship, the expected receive levels are very low. However, when unloading from the ship, an increase of the relevant signal levels can be determined immediately by the tag 1401 and hence the estimation of the environment class becomes possible.

According to a further embodiment, a tag 1401 can be attached to important sensible devices in order to determine in what environments the respective device provided with the tag 1401 has been used (e.g., outdoors or indoors, etc.). In that way, when reading out the tag 1401 (e.g., in the workshop) it can be determined how, when and where the device had been used. Thereby, correct or incorrect usage of the device can be verified.

Above that, temporal allocation in retrospect is possible as long as the spectrograms (or the statistically adjusted data) are stored with a time stamp in the memory 1404. The memory 1404 is a non-volatile memory, such as a flash EEPROM memory.

Figure 13:
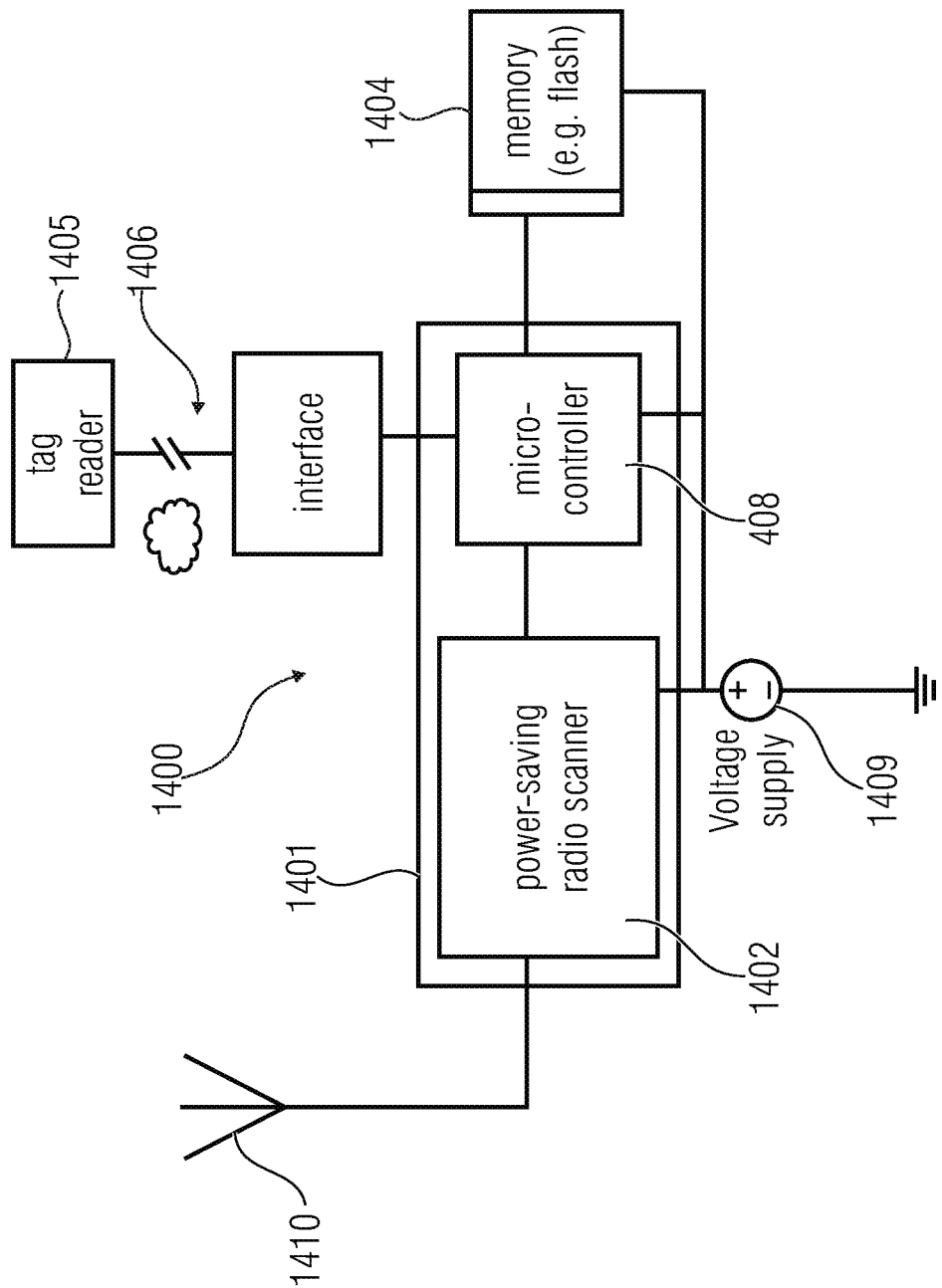
FIG. 13 is a block diagram of an embodiment of an inventive system comprising a tag, a memory and an interface to a tag reader.

FIG. 13 shows in summary a block diagram of an embodiment of an inventive system 1400.

The system 1400 comprises a tag 1401. The tag 1401 comprises a frequency spectrum generator 1402 connected to a microcontroller 1408. The frequency spectrum generator 1402 is configured as an energy-saving IC (integrated circuit) for detecting frequency spectra. For this, the frequency spectrum generator 1402 is connected to an antenna 1410. Above that, the frequency spectrum generator 1402 is connected to a sufficiently large flash EEPROM memory 1404, for example via the energy-saving microcontroller 1408. Further, the system comprises an interface 1406. Via this interface 1406, a tag reader 1405 can be connected to the tag 1401 in order to communicate with the same.

The structure illustrated in FIG. 13 can be used as inventive system 1400 with tag 1401 for detecting position information over time. A battery as well as energy-harvesting solutions are possible as a voltage and current supply 1409. By energy-saving implementation or configuration of the tag 1401, regular recordings of the spectrum (e.g. every 5 seconds) across a very long time period are possible.

Based on the regularly recorded spectrograms, it is possible to detect:
Region
Continent
Ocean
Harbor (possibly also location)
Cargo in movement (drive)
Cargo is discharged (shipping)
Means of transport (airplane, maritime vessel, inland vessel, cargo train, truck/automobile, forklift, etc.).

Thus, among others, the inventive apparatus has the following advantages:

Thus, with the present invention, among others, the environment, the radio channel and the velocity of the inventive apparatus 1301 can be estimated from the type and the time course of the signals.

In some embodiments, this can be used, among others, to operate at least one component 1310 in a mobile device 1309 in a specific operating state depending on the environment and the need. The inventive apparatus 1301 and the inventive method, respectively, are additionally suitable for implementation in an integrated circuit with very low current-consumption.

By the inventive evaluation of the levels of the different transmitters (radio, mobile radio, WLAN, DECT, etc.) in the spectrogram, the location and channel characteristics at this location can be inferred. If no or only very few transmitters are detected, it is very likely that no mobile communication will be possible, thus, the mobile radio modem might be switched off.

By a suitable evaluation of the measured spectra, the coarse environment where the inventive apparatus 1101 resides can be estimated. It cannot only be inferred whether the apparatus 1101 is in a basement room, in an underground parking garage, indoors or outdoors, but also the type of environment and the settlement density can be inferred.

This information can be used, for example, to switch at least one component 1310 in a mobile device 1309 on or off, depending on the environment, in order to reduce, for example, energy consumption. Thus, it is useful, for example, to switch off the satellite navigation system indoors in order to save power. However, as soon as it is detected that the apparatus 1301 is outdoors again, the navigation system is automatically switched on again. Similar processes can be implemented with other energy consumers, such as WLAN, mobile radio modem, Bluetooth etc.

The data determined by evaluating a spectrogram cannot only help to improve the energy management of a mobile device 1309. Above that, it is possible to increase the security of a mobile device 1309, since some services, such as WLAN, Bluetooth and the same are only switched on when the same are needed from the user's point of view.

As described so far, the apparatus 1101, 1301, 1401 according to the first aspect of the invention can comprise a frequency spectrum generator 1102, 1302, 1402 for generating a frequency spectrum. A second aspect of the invention that will be described below with reference to FIGS. 14 to 21 relates to a frequency spectrum generator 2000. This frequency spectrum generator 2000 can, for example, be used as a frequency spectrum generator 1102, 1302, 1402 used in the above-described apparatus 1101, 1301, 1401.

Figure 14:
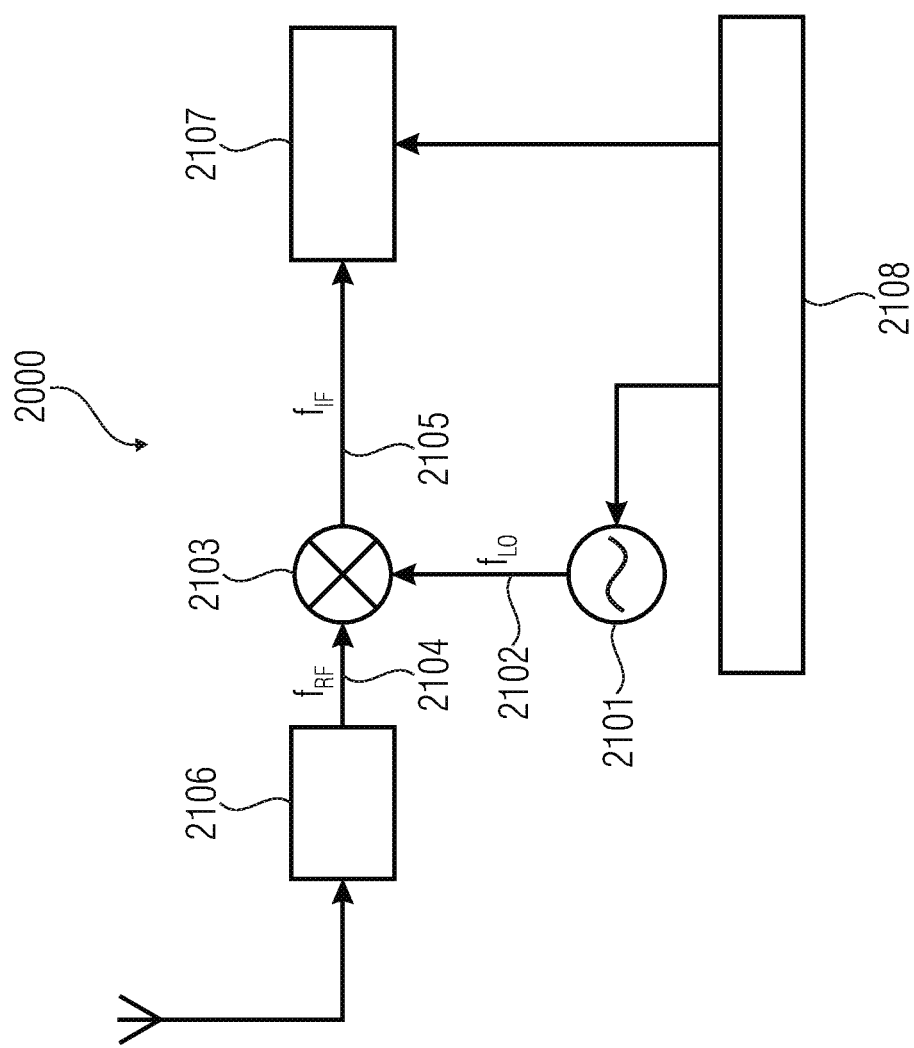
FIG. 14 is a schematic block diagram of an inventive frequency spectrum generator.

FIG. 14 shows an embodiment of an inventive frequency spectrum generator 2000. The frequency spectrum generator 2000 comprises a tunable local oscillator 2101. The local oscillator 2101 is configured to output a local oscillator signal 2102. The local oscillator signal has a frequency $f_{LO}$.

Further, the frequency spectrum generator 2000 comprises a downmixer 2103. The downmixer 2103 is configured to downmix a received antenna signal 2104 with the local oscillator signal 2102. Accordingly, a downmixed signal 2105 is obtained.

The antenna signal 2104 comprises a receive frequency $f_{RF}$. The downmixed signal 2105 has an intermediate frequency $f_{IF}$.

Further, the frequency spectrum generator 2000 comprises a filter 2106. The filter 2106 is configured to filter out a mirror-frequency portion of the antenna signal 2104 in the downmixed signal 2105. In other words, the filter 2106 filters the mirror-frequency portion out of the antenna signal 2104, such that this mirror-frequency portion is not entered into the mixer 2103. Thus, the downmixed signal 2105 includes no mirror-frequency portion. In other words, the mirror-frequency portion of the antenna signal 2104 has been filtered out in the downmixed signal 2105.

Further, the frequency spectrum generator 2000 comprises a signal level detector 2107. The signal level detector 2107 is configured to detect a signal level of the downmixed signal 2105 at an intermediate frequency $f_{IF}$.

Further, the frequency spectrum generator 2000 comprises a control 2108. The control 2108 is configured to control the local oscillator 2101 and the signal level detector 2107 in a sequential or clocked manner in order to sample a frequency spectrum of the antenna signal 2104 at a sequence of sampling frequencies. In other words, the control 2108 controls the local oscillator 2101 and the signal level detector 2107 such that the operating state of the local oscillator 2101 and the signal level detector 2107 is cycled between an active and inactive state in a sequential and clocked manner, respectively. Thereby, an applied antenna signal 2104 is sampled. By sampling the antenna signal 2104 at a sequence of sampling frequencies, a frequency spectrum can be sampled and generated which includes exactly those sampling frequencies.

The control 2108 is configured to change the frequency $f_{LO}$ of the local oscillator signal 2102 during sequential control, such that a difference between the local oscillator frequency $f_{LO}$ and the sampling frequency $f_{RF}$ corresponds to the intermediate frequency $f_{IF}$ and the respective local oscillator frequency $f_{LO}$ lies between the respective sampling frequency $f_{RF}$ and the respective mirror-frequency portion $f_{SP}$.

Figure 18:
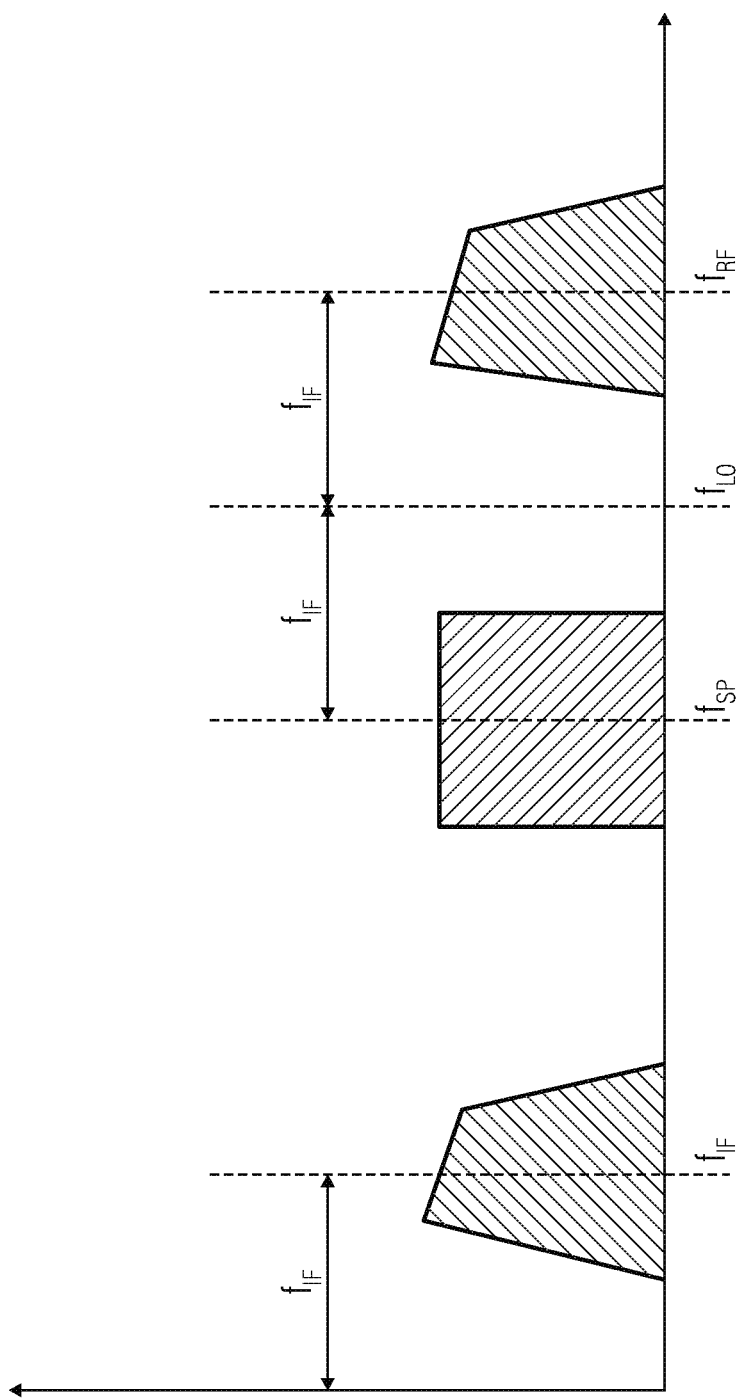
FIG. 18 is a frequency diagram for illustrating mirror frequencies.

For illustration purposes, FIG. 18 shows a frequency diagram. The receive and sampling frequency $f_{RF}$, respectively, of the antenna signal 2104 can be seen in the right part of the diagram. By mixing the antenna signal 2104 with a local oscillator signal of the frequency $f_{LO}$, on the one hand, a downmixed signal 2105 results with an intermediate frequency $f_{IF}$ which can be seen in the left part of the diagram. The downmixed signal 2105 with the intermediate frequency $f_{IF}$ is desired. On the other hand, also, a mirror-frequency portion $f_{SP}$ spaced apart from the local oscillator frequency $f_{LO}$ by the distance of the frequency $f_{IF}$ occurs. The mirror-frequency portion $f_{SP}$, however, is undesirable and is therefore suppressed according to the invention.

The table 1 shown below shows an example for a performed mirror-frequency suppression during receive frequency tuning.

TABLE 1

| RF receive frequency $f_{RF}$ [MHz] | Mirror frequency $f_{mirror}$ [MHz] | Local oscillator $f_{LO}$ [MHz] | Mixing process | $f_{RF}:f_{mirror}$ |
|---|---|---|---|---|
| 950 | 1200 | 1075 | HIGH SIDE INJECTION | 0.79 |
| 900 | 1150 | 1025 | HIGH SIDE INJECTION | 0.78 |
| 850 | 1100 | 975 | HIGH SIDE INJECTION | 0.77 |
| 800 | 1050 | 925 | HIGH SIDE INJECTION | 0.76 |
| 750 | 1000 | 875 | HIGH SIDE INJECTION | 0.75 |
| 700 | 450 | 575 | LOW SIDE INJECTION | 1.56 |
| 650 | 400 | 525 | LOW SIDE INJECTION | 1.63 |
| 600 | 350 | 475 | LOW SIDE INJECTION | 1.71 |
| 500 | 250 | 375 | LOW SIDE INJECTION | 2.00 |

In the first column, the individual receive and sampling frequencies, respectively, are indicated. The frequency spectrum of interest ranges from 950 MHz to 500 MHz.

In the second column, the mirror-frequency portions $f_{SP}$ belonging to each sampling frequency $f_{RF}$ are indicated, which result, as mentioned above, when mixing the antenna signal 2104 with the local oscillator signal 2102.

The frequencies $f_{LO}$ of the local oscillator signal 2102 are indicated in the third column.

The respective type of mixing process is indicated in the fourth column. Here, a differentiation is made between the so-called high-side injection and the so-called low-side injection. In the high-side injection, the local oscillator frequency $f_{LO}$ is above the sampling frequency $f_{RF}$. In the low-side injection, the local oscillator frequency $f_{LO}$ is below the sampling frequency $f_{RF}$. In both mixing processes, the antenna signal 2104 is downmixed.

The respective ratio of the sampling frequency $f_{RF}$ to mirror frequency $f_{sp}$ is indicated in the fifth column.

Thus, as mentioned above, the first column shows the frequency spectrum of interest which is to be determined by sampling. The respective sampling frequencies are in a range between 500 MHz and 950 MHz. Thus, this range is the sampled frequency spectrum.

According to an embodiment of the invention, the control 2108 is configured to change, at a respective sampling frequency $f_{RF}$, the frequency $f_{LO}$ of the respective local oscillator signal 2102 such that the respective mirror-frequency portion $f_{SP}$ lies below and above, respectively, the sampled frequency spectrum.

For example, the values of the respective mirror-frequency portions $f_{SP}$ of the first five rows (high-side injection) are all above the sampled frequency spectrum, i.e. above the highest sampling frequency $f_{RF}$ with 950 MHz.

The values of the respective mirror-frequency portions $f_{SP}$ of the bottom four rows (low-side injection) are all below the sampled frequency spectrum, i.e. below the lowest sampling frequency $f_{RF}$ with 500 MHz.

As can be seen, the choice of the local oscillator frequency $f_{LO}$ determines the location of the mirror-frequency portion $f_{SP}$. By skillful choice of the local oscillator frequency $f_{LO}$, the location of the respective mirror-frequency portion $f_{SP}$ can be placed such that the same is outside the frequency spectrum of interest and hence no longer interferes with the detection of the entire frequency spectrum.

Additionally, the local oscillator frequency $f_{LO}$ can be selected for a respectively given sampling frequency $f_{RF}$ such that the mirror-frequency portion $f_{SP}$ is in a frequency band that is hardly occupied (e.g. in Germany between 1000 MHz and 1400 MHz), so that the signal portions from the reception of the mirror frequency $f_{sp}$ do not occur in the receiver or in an irrelevant manner (on the intermediate frequency side at $f_{IF}$).

Figure 15:
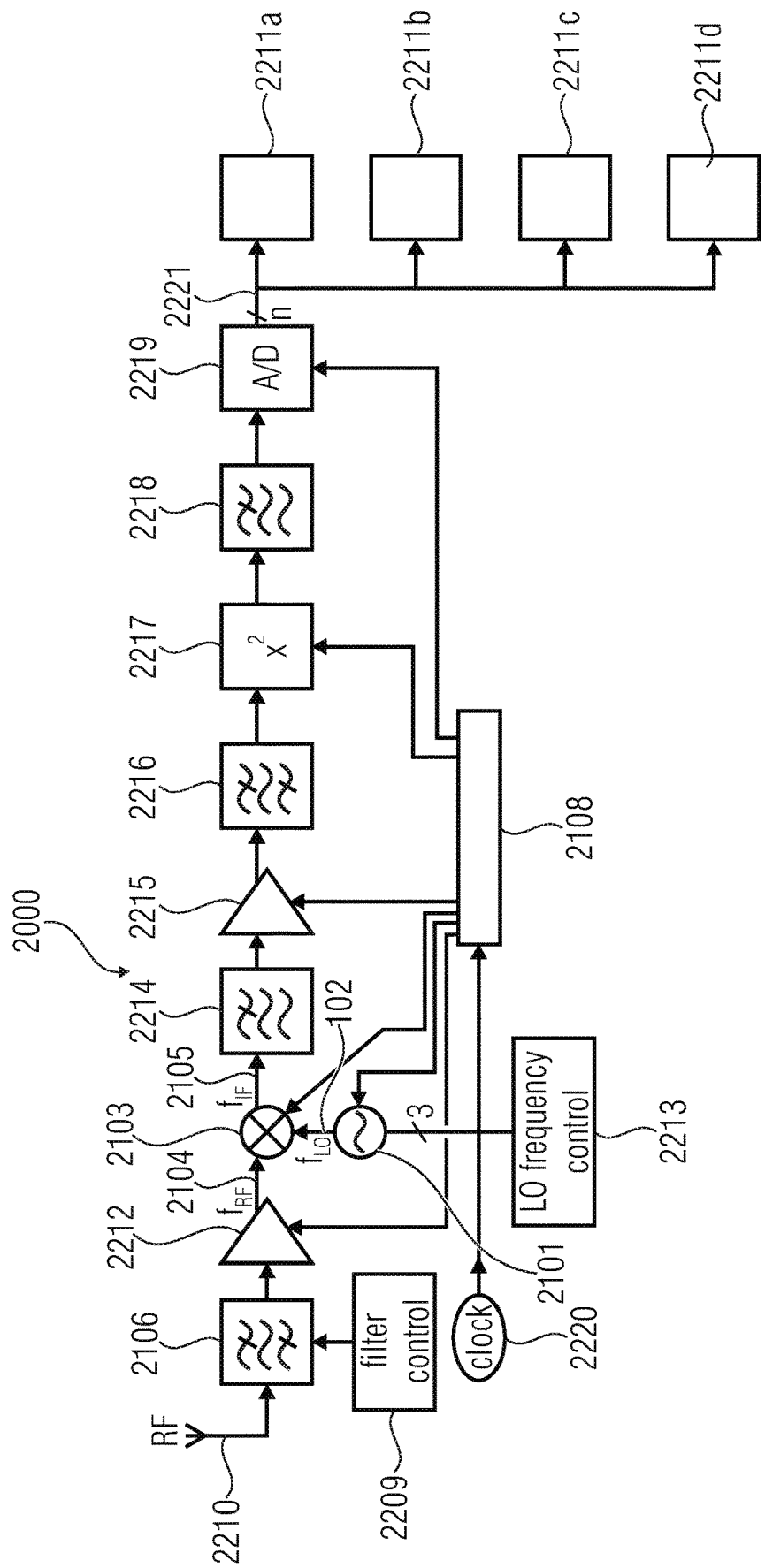
FIG. 15 is an embodiment of a frequency spectrum generator.

In on embodiment, such as shown in FIG. 15, the filter 2106 comprises a filter control 2209. The filter control 2209 is configured to change the filter characteristic of the filter 2106 in dependence on the selected frequency $f_{LO}$ of the local oscillator signal 2102 and/or the selected sampling frequency $f_{RF}$. As an example for this, Table 1 can be used again.

In the first row of Table 1, it can be seen that an antenna signal 2104 is sampled at a receive and sampling frequency $f_{RF}$, respectively, of 950 MHz and downmixed with a local oscillator signal 2102 with the frequency $f_{LO}$ of 1075 MHz. Here, a mirror-frequency portion $f_{SP}$ occurs at 1200 MHz. If sampling is performed at a later time with a different sampling frequency $f_{RF}$, e.g. with 700 MHz (row 6 of Table 1), downmixing is performed with a local oscillator signal 2102 of a frequency $f_{LO}$ of 575 MHz, wherein a mirror-frequency portion $f_{SP}$ occurs at 450 MHz.

Depending on the sampling frequency $f_{RF}$ and the local oscillator frequency $f_{LO}$, the filter control 2209 can control the filter 2106 in order to change its filter characteristic. Here, the filter characteristic of the filter 2106 is changed such that the mirror-frequency portion $f_{SP}$ is filtered out from the antenna signal 2104 at the respective sampling frequency $f_{RF}$. For that purpose, the filter 2106 is either a broadband filter or a tunable filter, in particular a tunable bandpass filter.

Thus, by the filter 2106, an undesired mirror-frequency portion $f_{SP}$ occurring at the respective sampling frequency $f_{RF}$ can be filtered out from the antenna signal 2104 at any sampling frequency $f_{RF}$.

Here, the requirements for the filter are dependent on the distance of the sampling frequency $f_{RF}$ to the respective mirror-frequency portions $f_{SP}$ and the ratio $$\frac{f_{RF}}{f_{SP}}$$

which is entered in the last column of Table 1, respectively. Thus, in one embodiment, the control 2108 is configured to adjust the frequency $f_{LO}$ of the local oscillator signal 2102 such that, at a sampling frequency $f_{RF}$, a ratio of sampling frequency to the respective mirror-frequency portion $$\frac{f_{RF}}{f_{Sp}}$$

results, wherein the ratio is in a range between 0.5 and 0.8 or in a range between 1.5 and 2.0.

Thereby, the filter request for the adjustable bandpass filter regarding signal suppression at $f_{SP}$ is relaxed. In the case of $f_{RF}$=500 MHz (see last row in Table 1), the frequency ratio $$\frac{f_{RF}}{f_{Sp}}$$

is even 2:1, which relaxes the requirement for an adjustable bandpass filter. If in that case the local oscillator frequency would be selected with 625 MHz (high-side injection), the mirror frequency would be at 750 MHz, which results in a frequency ratio $$\frac{f_{RF}}{f_{Sp}}$$

of 1.5:1 and would need a bandpass filter with a steeper edge for the same mirror frequency suppression.

The mirror frequency suppression is comprised of several attenuations in the receiver chain:
a) the LNA frequency response,
b) the tunable bandpass filter (advantageously as LC filter), and
c) the frequency response of the matching network and the receive antenna.

As already mentioned above, in one embodiment, the control 2108 is configured to operate the local oscillator 2101 in two operating modes, wherein in a first operating mode (high-side injection) the local oscillator 2101 is controlled such that the frequency $f_{LO}$ of the local oscillator signal 2102 is above the respective sampling frequency $f_{RF}$, and wherein in a second operating mode (low-side injection) the local oscillator 2101 is controlled such that the frequency $f_{LO}$ of the local oscillator signal 2102 is below the respective sampling frequency $f_{RF}$.

Further, in one embodiment, the control 2108 is configured to switch between the two operating modes, i.e. between high-side injection and low-side injection during the process of sampling the frequency spectrum of an antenna signal 2104. This is indicated in Table 1 by the thick horizontal bar between the fifth and sixth rows.

In particular, the control 2108 switches between the two operating modes exactly when downward-mixing of the antenna signal 2104 with the local oscillator signal 2102 would result in a mirror-frequency portion $f_{SP}$ lying within the frequency spectrum to be sampled. For example, in row 6 of Table 1, high-side injection with a local oscillator frequency $f_{LO}$ of 825 MHz would result in a mirror-frequency portion $f_{SP}$ of 950 MHz. Thus, this mirror-frequency portion $f_{SP}$ would correspond to the top sampling frequency (Table 1, row 1). In other words, this mirror-frequency portion $f_{SP}$ would lie within the frequency spectrum to be sampled, which is why the control 2108 switches to low-side injection at this position.

In one embodiment, the control 2108 is configured to select the sampling frequencies $f_{RF}$ in descending order in order to sample the frequency spectrum of an antenna signal 2104 in descending order from high to low sampling frequencies $f_{RF}$. This can be seen in the first column of Table 1, wherein the frequency spectrum of the antenna signal 2104 would be sampled in descending order, starting at a sampling frequency $f_{RF}$ of 900 MHz down to 500 MHz.

Sampling in reverse, i.e. ascending order would also be possible. Thus, according to a further embodiment, the control 2108 is configured to select the sampling frequencies $f_{RF}$ in ascending order in order to sample the frequency spectrum of an antenna signal 2104 in ascending order from low to high sampling frequencies $f_{RF}$.

According to a further embodiment, the control 2108 is configured to select the sampling frequencies $f_{RF}$ arbitrarily in order to sample the frequency spectrum of an antenna signal 2104 in arbitrary order.

As also shown in Table 1, the distances between the sampling frequencies $f_{RF}$ can be distributed equidistantly across the frequency spectrum of the antenna signal 2104 to be sampled. In the example shown in Table 1, the distances of the sampling frequencies $f_{RF}$ are 50 MHz each. These distances also designate the step width of the local oscillator 2101.

In one embodiment, the local oscillator 2101 can be tunable in steps having a specific step width, wherein the step width is approximately 50 MHz, advantageously approximately 25 MHz, more advantageously approximately 10 MHz and most advantageously approximately 1 MHz.

With the variable step width of the local oscillator, it is possible that the distance between a first and a second sampling frequency differs from a distance between the second and a third sampling frequency. The distances of the sampling frequencies differ from one another, namely by the respective step width of the local oscillator.

Figure 20A:
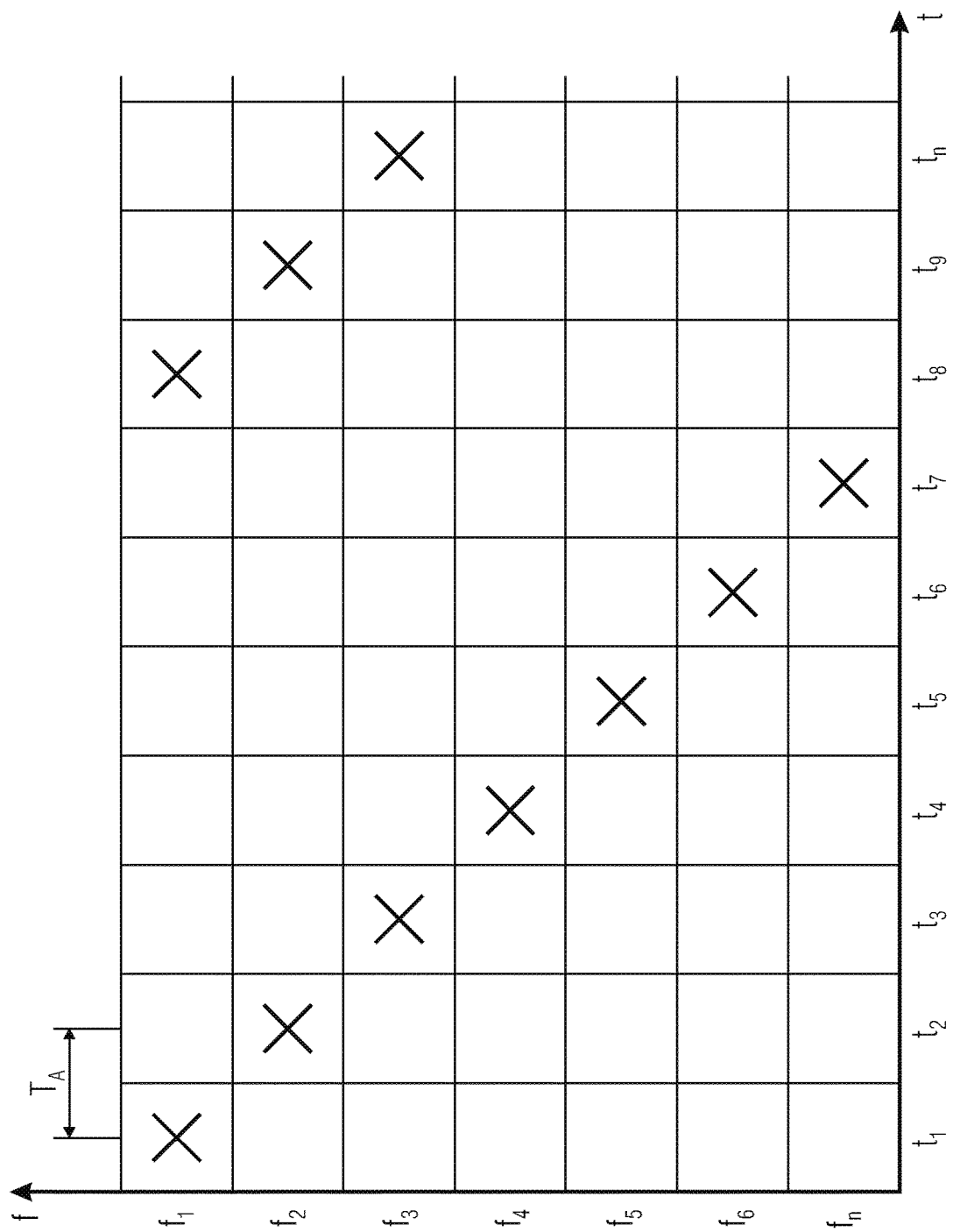
FIG. 20A is a table for illustrating sample values according to an order.

FIGS. 20A to 20C show schematic examples for sampling a frequency spectrum at the sequence of sampling frequencies. Here, the time is plotted on the abscissa. Frequency values, more accurately the sampling frequencies are plotted on the ordinate. Here, the sampling frequency values have no specific numerical values but are merely indicated by indices of $f_1$ to $f_n$. The same applies for the times $t_1$ to $t_n$.

In the example shown in FIG. 20A, a frequency spectrum is sampled at discrete times $t_1$ to $t_n$ at respective discrete sampling values (sampling frequencies $f_1$ to $f_n$). The frequency spectrum is sampled in order of the sampling frequencies $f_1$ to $f_n$ at subsequent times $t_1$ to $t_6$. From the time $t_7$ onwards, the sampling process is repeated in the same order. The interval passed between times $t_1$ and $t_6$ is referred to as sampling interval or also as frequency sweep. The time period for passing one or several sampling intervals, as well as storing the determined values within this time period is also referred to as memory length. The average value between two sampling times $t_1$ and $t_2$ designates the sampling period $T_A$.

In the example shown in FIG. 20B, the frequency spectrum is sampled in an arbitrary order of sampling frequencies. The frequency spectrum can, for example, be sampled in a sampling interval between $t_1$ and $t_6$ in differing and arbitrary order, respectively, at the sampling frequencies $f_1$ to $f_n$ such that sampling is performed once per sampling interval at all sampling frequencies.

FIG. 20C shows a further example where a frequency spectrum is sampled at two receive frequencies of interest, namely $f_2$ and $f_5$. Here, the frequency spectrum is sampled alternately at the sampling frequencies $f_2$ and $f_5$, at subsequent times. However, it is also possible that one of the two sampling frequencies $f_2$ and $f_5$, respectively, is selected arbitrarily at subsequent times. Thus, frequency ranges of specific interest can be scanned, such as 433 MHz and 866 MHz.

The signal level detector 2107 is configured to detect a signal level at each discrete sampling frequency and to determine the value of the respective signal level as well as to relate the individual signal levels to one another. These values output by the signal level detector 2107 can be stored in a memory. Alternatively or additionally, these values output by the signal level detector 2107 can be statistically evaluated by a calculating unit 2211 as explained in more detail below.

When needed, the inventive frequency spectrum generator 2000 offers a high update rate, e.g., every 10 ms (up to 100 times/second). The update rate can be selected in a variable manner.

In one embodiment, the inventive frequency spectrum generator 2000 samples the frequency spectrum very fast (<50 ms) and generates discrete sampling values for the frequency range 10 MHz to 100 GHz, which are stored in a static RAM as discretized spectrograms.

Figure 16:
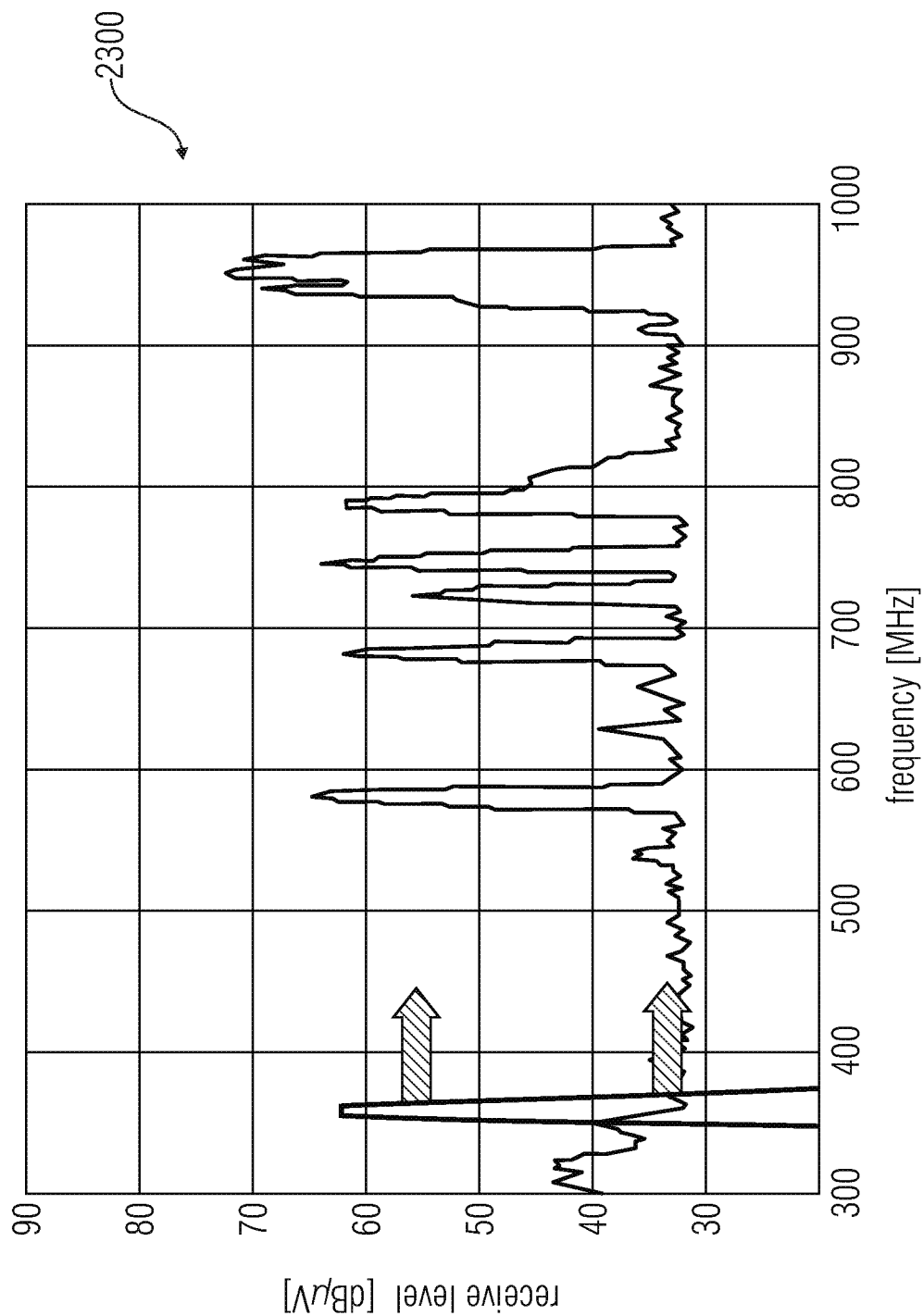
FIG. 16 is an image of an HF spectrum to be sampled by the frequency spectrum generator.
Figure 17:
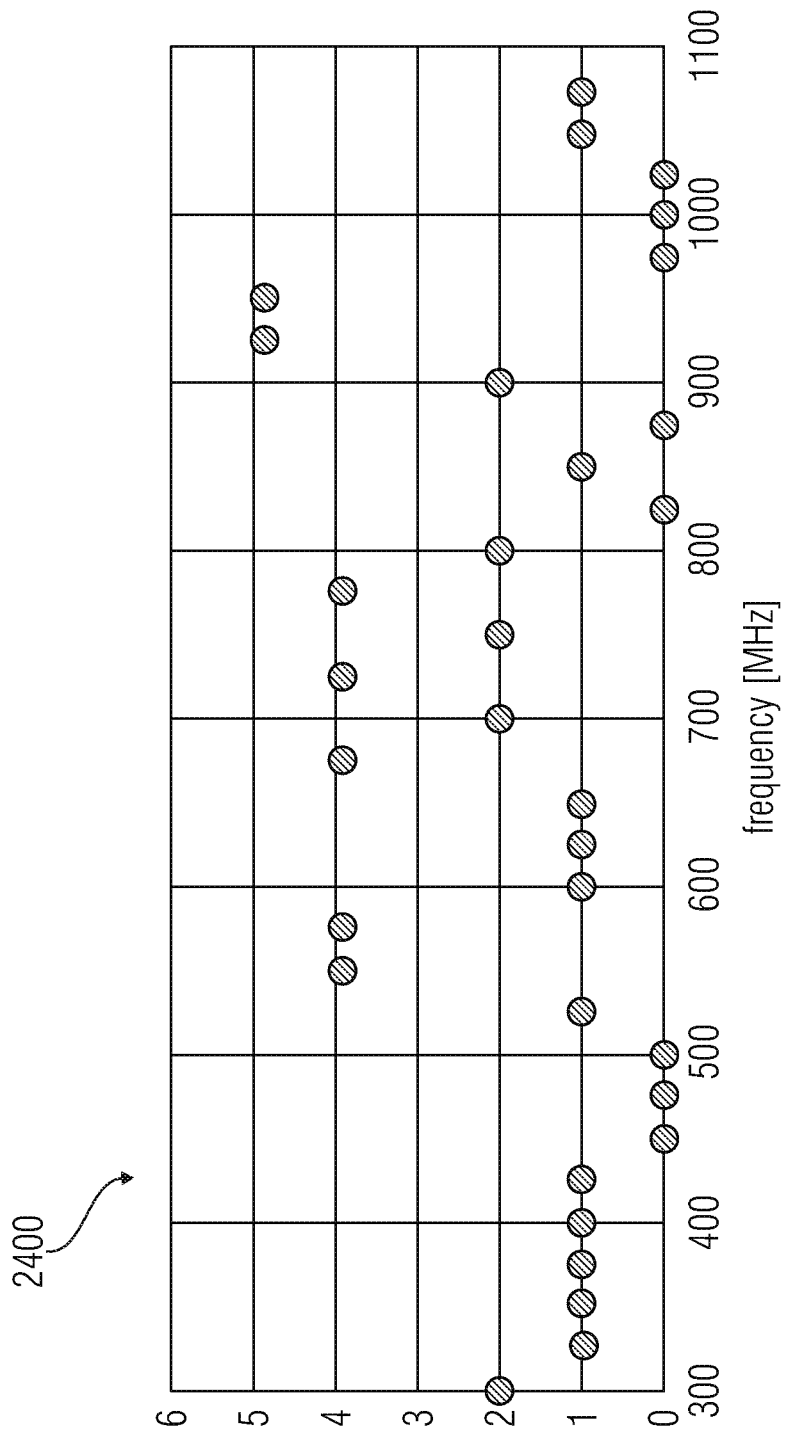
FIG. 17 is an image of a quantized frequency spectrum with discrete frequency values.

FIG. 16 shows an image of a frequency spectrum 2300 sampled within an inventive frequency spectrum generator 2000. This actually existing HF spectrum (FIG. 16) is continuously detected with the inventive frequency spectrum generator 2000 and quantized with a specific frequency raster and a specific amplitude resolution and illustrated by a finite number of points in a discretized spectrogram 2400 (FIG. 17). Continuous detection means that the frequency spectrum generator 2000 operates in an intermittent, i.e., sampling manner, but samples the frequency spectra continuously, i.e., in repeating orders. In other words, the sampling frequency spectrum generator 2000 operates continuously.

The discretized spectrograms need merely a low amount of data of, e.g., less than 1000 bit. Due to the low amount of data, (e.g., <1000 bit), the spectrograms can be evaluated by simple algorithms in a power-saving manner and can be stored in a RAM without necessitating complex arithmetic units as in digital signal processors. In that way, a highly current-saving operation of the inventive frequency spectrum generator is realized.

Thus, by sampling at the sampling frequencies $f_1$ to $f_n$ at discrete times $t_1$ to $t_n$, a time-spectral portion of a frequency spectrum can be determined. A calculating unit 2211a to 2211d shown in FIG. 15 is configured to subject this time-spectral portion of the frequency spectrum to a statistical evaluation and to hence obtain statistical quantities defining this time-spectral portion.

The calculating unit 2211a is, for example, configured to subject a time-spectral portion sampled in a time period of approximately 60 seconds to a statistical evaluation. These statistical quantities can, for example, be a central tendency that can be seen within the sampling period, such as a tendency for a decreasing signal level reception at a specific sampling frequency. However, it can also be a dispersion or determined extreme values. For example, a maximum receive level, a minimum receive level, an average receive level or also a relative occupancy period can be determined.

At least part of these statistical quantities can, for example, be determined in a sampling-frequency individual manner from a time sequence of sampling values at a respective sampling frequency. In that way, for example, a maximum and/or minimum receive level can be determined at the sampling frequency $f_3$ in that signal levels applied at the respective sampling times are statistically evaluated by the calculating unit 2211 across a respective sampling period.

For example, also sampling values exceeding the thresholds can be determined. In that way, it can be detected within the sampling interval at what sampling frequencies a specific threshold signal level has been exceeded how many times. Based thereon, for example, an occupancy duration of the respective sampling frequency can be inferred.

The calculating units 2221a to 2211d shown in FIG. 15 have different memory lengths for the determined statistical quantities, i.e., the calculating units 2211a to 2211d have sampling intervals of different lengths and store the determined values for different time spans.

Alternatively or additionally, the memory length of the determination of the determined statistical quantities can be determined in dependence on the number of sampling values. In one embodiment, the memory length of the determination of the statistical quantities is selected such that an average number of sampling values with respect to each sampling frequency is greater than or equal to 10. In other words, the statistical quantities are evaluated by a calculating unit 2211 until, on average, at least ten values have been collected at all sampling frequencies.

In one embodiment, the calculating unit 2211 is configured to determine the statistical sizes such that a maximum receive level and/or a minimum receive level and/or an average receive level and/or a relative occupancy period can be determined from the same.

Figure 21:
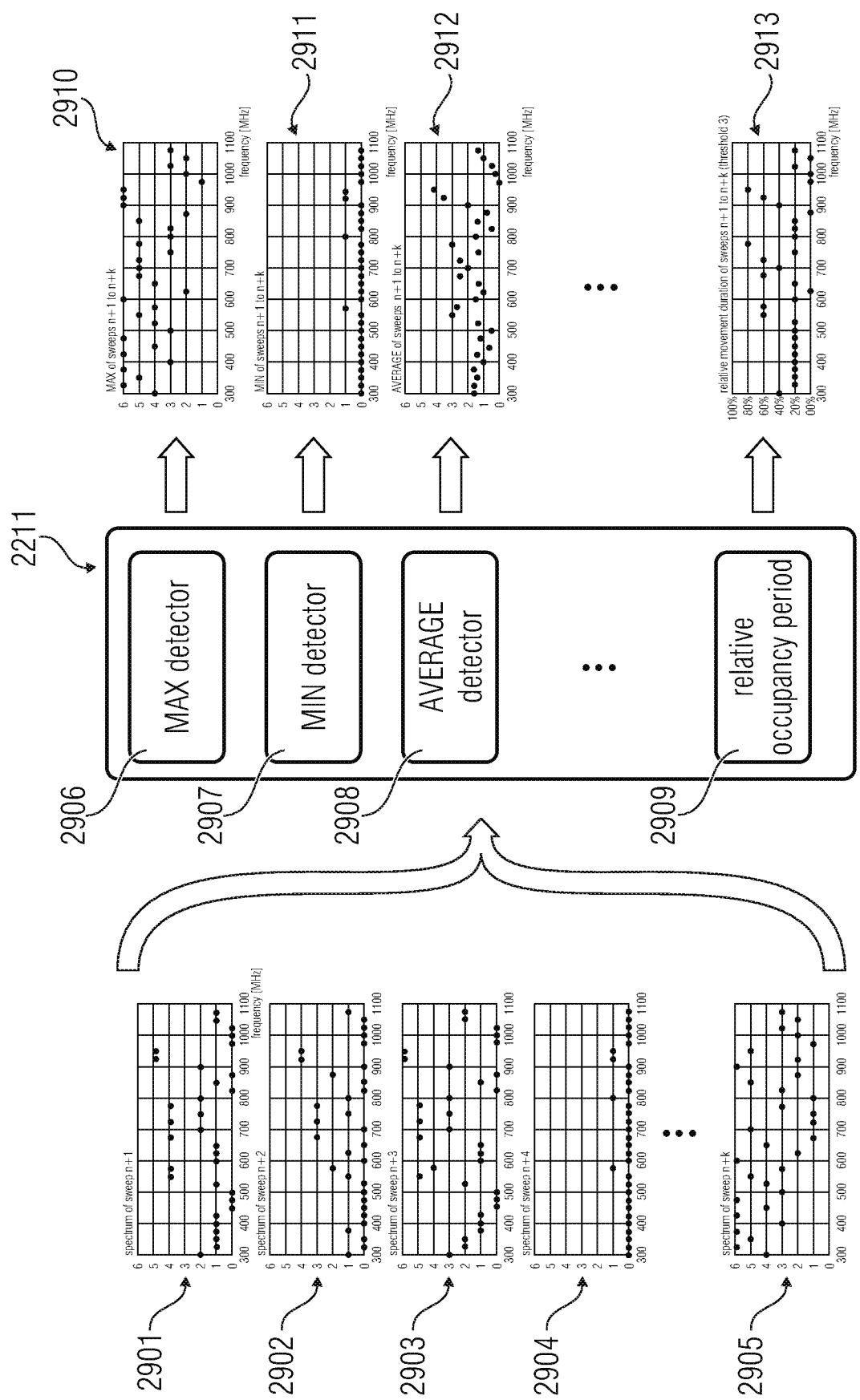
FIG. 21 is an overview of statistical evaluations of individual discretized frequency spectrograms.

One example for this is shown in FIG. 21. Here, k designates the number of storable frequency spectra and hence corresponds at the same time to the memory length.

Generated discretized frequency spectra 2901 to 2905 are shown on the left side in FIG. 21. The first frequency spectrum 2901 has been generated by the inventive frequency spectrum generator 2000 during a first frequency sweep. The second frequency spectrum 2902 has been generated by the inventive frequency spectrum generator 2000 during a second frequency sweep. The third frequency spectrum 2903 has been generated by the inventive frequency spectrum generator 2000 during a third frequency sweep. The fourth frequency spectrum 2904 has been generated by the inventive frequency spectrum generator 2000 during a fourth frequency sweep. The fifth frequency spectrum 2905 corresponds to a k-th frequency spectrum and has been generated by the inventive frequency spectrum generator 2000 during a k-th frequency sweep.

The calculating unit 2211 comprises a maximum value detector 2906, a minimum value detector 2907, an average value detector 2908 as well as a detector 2909 for determining the relative occupancy period.

The maximum value detector 2906 is configured to detect, from at least a subset of the sampling frequencies occurring in the k discretized frequency spectra, a respective maximum value of a receive level at a respective sampling frequency. These maximum values can be stored and further processed and can be shown, for example, in a maximum value spectrogram 2910. In other words, a maximum value spectrogram is established from all sweeps n+1 to n+k.

The minimum value detector 2907 is configured to detect, from at least a subset of the sampling frequencies occurring in the k discretized frequency spectra, a respective minimum value of a receive level at a respective sampling frequency. These minimum values can be stored and further processed and can be shown, for example, in a minimum value spectrogram 2911. In other words, a minimum value spectrogram is established form all sweeps n+1 to n+k.

The average value detector 2908 is configured to detect, from at least a subset of the sampling frequencies occurring in the k discretized frequency spectra, a respective average value of a receive level at a respective sampling frequency. These average values can be stored and further processed and can be shown, for example, in an average value spectrogram 2912. In other words, an average value spectrogram is established from all sweeps n+1 to n+k.

The detector 2909 for determining the relative occupancy period is configured to determine, from at least a subset of the sampling frequencies occurring in the k discretized frequency spectra, an average occupancy period of the respective sampling frequency. This can take place, among others, as described above by means of determining a number of sampling values exceeding the thresholds. In this example, the threshold lies at 3 as indicated above the spectrogram 2913. These values representing the relative occupancy period can be stored and processed further and can be indicated, for example, in a spectrogram 2913 indicating a relative occupancy period.

The discretized spectrograms and the evaluation of the discretized spectrograms, respectively, allows, among others, a classification of the radio environment. By evaluating the time curve of the spectrograms, for example, fading or shading can be skillfully used in order to infer specific environment and movement scenarios (such as entering a multistory building, driving with the lift) and to thereby determine velocities of moveable transmitters or carriers of a transmitter to the mobile device. Such scenarios are described in the German patent application DE 10 2015 213 313.3 of the applicant which is herein enclosed by reference.

In order to spare the user data evaluation with a power-consuming microcontroller or microprocessor, in the present invention, a power-saving frequency spectrum generator 2000 for statistic evaluation of long time spectral data is suggested. Since the inventive frequency spectrum generator 2000 can operate continuously due to the low current consumption and provides spectral data, the inventive frequency spectrum generator 2000 determines from the continuously incoming spectral data channel-related quantities, such as maximum receive level, minimum receive level, average receive level, relative occupancy period.

According to one embodiment, the inventive frequency spectrum generator 2000 comprises a calculating unit 2211 (FIG. 15) for this, wherein the calculating unit 2211 is configured to determine, from at least part of the sampling frequencies $f_{RF}$ within the sampled frequency spectrum of an antenna signal 2104, a maximum receive level and/or a minimum receive level and/or an average receive level and/or a relative occupancy period.

Determining the minimum and maximum levels from a set of N measured spectrograms stored in a static RAM can be performed by simple digital comparators. The power consumption for a respective implementation as digital circuit can be very low without having an impact in the total current consumption. For determining the average receive levels, a simple adder is sufficient, which can also be implemented as digital circuit in a power-saving manner. Determining the relative occupancy period is performed as counting operation for each receive frequency $f_{FR}$ when the receive level exceeds a defined threshold.

Among others, the frequency spectrum generator 2000 can be operated in a power-saving and efficient manner since no stabilization with phase-locked loop, i.e., no PLL stabilization for the local oscillator 2101 is provided. The frequency spectrum generator 2000 can thus be operated in a manner unregulated by a phase-locked loop. Instead, coarse stabilization is performed in the sense of single calibration with a specific frequency raster, for example between 2 MHz and 10 MHz. Thus, no fine tuning is performed like in a phase-locked loop PLL.

Thus, only in the ideal case, the respective intermediate frequencies $f_{IF}$ entered in Table 1 have the entered firmly defined intervals with respect to one another. In the example shown in Table 1, the respective receive frequencies $f_{RF}$ have a uniform interval of 50 MHz with respect to one another.

The respective intermediate frequencies $f_{IF}$ vary at a certain interval around an intermediate frequency set value of, for example, 125 MHz as shown in Table 1. This interval is, for example, up to ±10% of the intermediate frequency set value of, in this example, 125 MHz.

By omitting PLL stabilization, the inventive frequency spectrum generator 2000 can be operated in a power-saving and efficient manner. Instead of fine tuning realized with phase-locked loops, the above-explained coarse stabilization by means of a frequency raster is used. Since here simple and advantageously passive circuit components can be used, the inventive frequency spectrum generator 2000 operates in a very power-efficient manner.

With regard to FIG. 19, a further embodiment of an inventive frequency spectrum generator 2000 is shown.

This frequency spectrum generator 2000 comprises, among others, a tunable local oscillator 2101 for outputting a local oscillator signal 2102. Further, the frequency spectrum generator 2000 comprises a downmixer 2103 for downmixing a received antenna signal 2104 with the local oscillator signal 2102 for obtaining a downmixed signal 2105.

Further, the frequency spectrum generator 2000 comprises a signal level detector 2107 for detecting a signal level of the downmixed signal 2105 at an intermediate frequency $f_{IF}$, as well as control 2108 for sequential control of the local oscillator 2101 and the signal level detector 2107 in order to sample a frequency spectrum of the antenna signal 2104 at a series of sampling frequencies $f_{FR}$.

As already mentioned above, the frequency spectrum generator 2000 operates in a very power-efficient manner. Here, the ratio of a switch-on period $T_{ON}$ for a sampling process to sampling period $T_A$ is selected such that the average total current consumption $$I_{AVG} = \frac{T_{ON}}{T_A} \cdot I_{ON}$$

is less than or equal to 100 µA, wherein $I_{ON}$ designates the current consumption in an active state during sampling.

According to a further embodiment, the ratio of switch-on period $T_{ON}$ for a sampling process to sampling period $T_A$ is selected such that the average total current consumption $$I_{AVG} = \frac{T_{ON}}{T_A} \cdot I_{ON}$$

is less than or equal to 50 µA, advantageously less than or equal to 25 µA and most advantageously less than or equal to 10 µA.

This frequency spectrum generator 2000 shown in FIG. 19 can also comprise the above-described means for mirror-frequency suppression. On the other hand, the frequency spectrum generator 2000 described above with reference to FIG. 14 can also have an average total current consumption $I_{AVG}$ with the just mentioned values.

FIG. 15 shows an embodiment of an inventive frequency spectrum generator 2000. In this example, the power-saving frequency spectrum generator 2000 is realized as sampling radio receiver with local oscillator retuning. More accurately, in this example, a simple superheterodyne receiver with adjustable RF bandpass filter is suggested as an architecture by which mirror-frequency suppression for a frequency retuning process can be realized.

The ratio of switch-on period $T_{ON}$ for a sampling process to sampling period $T_A$ is selected for power-saving operation such that the average total current consumption $$I_{AVG} = \frac{T_{ON}}{T_A} \cdot I_{ON}$$

is significantly below 100 µA. Here, $I_{ON}$ designates the current consumption in the active state during sampling.

Example: $T_{ON}$=100 ns and $T_A$=100 µs with $I_{ON}$=10 mA results in $I_{AVG}$=10 µA.

The frequency spectrum generator 2000 comprises an antenna 2210 for receiving an antenna signal 2104. An adjustable bandpass filter 2106 with a filter control 2209 for changing the filter characteristic is arranged behind the antenna 2210. An amplifier 2212 in the form of an LNA (Low Noise Amplifier) is arranged behind the adjustable filter 2106.

Further, the frequency spectrum generator 2000 comprises a local oscillator 2101 with a local oscillator frequency control 2213. Further, a mixer 2103 is provided that is arranged between the LNA 2212 and the local oscillator 2101.

A low-pass filter 2214, a further amplifier 2215, a low-pass filter 2216, a demodulator 2217 as well as a further low-pass filter 2218 are behind the mixer 2103. These elements 2214, 2215, 2216, 2217 serve to detect a signal level and thus form together a signal level detector 2107.

Further, the frequency spectrum generator 2000 comprises an analog/digital converter 2219 arranged behind the low-pass filter 2218 and several calculating units 2211a to 2211d. Optionally, the calculating units 2211a to 2211d can be arranged before or after the analog/digital converter 2219 and can accordingly be configured to process analog or digital input signals.

As already mentioned above, the calculating units 2211a to 2211d serve for statistical evaluation of the frequency spectra. Here, the calculating units 2211a to 2211d have different memory lengths. In other words, the calculating units 2211a to 2211d are configured to store frequency spectra generated across time periods of different lengths.

The first calculating unit 2211a, for example, has a memory length of approximately 1 minute. The second calculating unit 2211b has a memory length of 10 minutes. The third calculating unit 2211c has a memory length of 1 hour. The fourth calculating unit 2211d has a memory length of 12 hours or even 24 hours.

In that way, with the inventive frequency spectrum generator 2000, both short time (up to approximately 1 minute) and also long time evaluation (up to 12 hours and more) of the frequency spectra can be performed.

Further, the frequency spectrum generator 2000 comprises a control 2108. The control 2108 is connected to the LNA 2212, the local oscillator 2101, the mixer 2103, the amplifier 2215, the demodulator 2217 and the analog-digital converter 2219. The control 2108 can comprise a pulse control that can be supplied with a clock 2220, such that the control 2108 controls the connected members sequentially in the clock. The local oscillator frequency control 2213 as well as the filter control 2209 can be integrated in the control 2108.

First, an antenna signal 2104 received by the antenna 2210 is passed through the filter 2106. As described above, the respective mirror-frequency portions $f_{SP}$ are filtered out in the filter 2106.

Then, the filtered antenna signal 2104 is amplified in the LNA and guided into the mixture 2103. In the mixer 2103, the amplified antenna signal 2104 of the frequency $f_{RF}$ is downmixed with the local oscillator signal 2102 of the frequency $f_{LO}$. At the output of the mixer 2103, a downmixed intermediate frequency signal 2105 of the intermediate frequency $f_{IF}$ is obtained.

In the low-pass filter 2214, the lower frequency portion of the intermediate frequency $f_{IF}$ is passed. This signal is then amplified in the amplifier 2215 and guided into the bandpass filter 2216. The bandpass filter 2216 comprises a narrow-band pass band and serves to suppress noise signal portions.

The signal is demodulated in the demodulator 2217, the average signal energy is determined and the demodulated signal passes a further low pass filter 2218. The output signal of the low-pass filter 2218 is guided into the analog-digital converter 2219. This can, for example, be a simple comparator circuit. An RSSI (Received Signal Strength Indication) value can, for example, be tapped as output signal.

With the inventive frequency spectrum generator 2000, for example, an apparatus for broadband, power-saving and continuous reception of spectra can be provided, wherein the frequency spectrum generator 2000 covers a frequency band between 30 kHz and 30 GHz, advantageously between 30 MHz and 30 GHz, more advantageously between 30 MHz and 5 GHz and most advantageously between 30 MHz and 1 GHz. When needed, the inventive frequency spectrum generator 2000 offers a high update rate, e.g., every 10 ms (up to 100 times/second). The update rate can be selected in a variable manner. In one embodiment, the inventive frequency spectrum generator 2000 samples the frequency spectrum very fast (<50 ms) and generates discrete sample values for the frequency range 300 MHz to 1 GHz that are stored in a static RAM as discretized spectrograms.

As mentioned above, the inventive frequency spectrum generator 2000 allows, apart from storing the raw data, also the storage of statistically processed data with greater memory length (e.g., 10 seconds, 10 minutes or 1 hour).

The frequency raster does not have to be equidistant, can be fragmentary and does not have to be sweeped in a continuous or linear manner but can also be sweeped arbitrarily (then, aliasing effects when obtaining a spectrogram are significantly suppressed). A specific selection of frequency points is also possible for the operation (e.g., only for frequencies of interest for short range devices or ISM frequencies). The receiver bandwidth per frequency point can be configured in a variable manner. Higher bandwidths allow faster detections of spectrograms.

The following application scenarios are possible with the inventive frequency spectrum generator 2000:

Determining spectrograms and channel occupancies in a power-saving manner

Power-saving assistance system during radio network planning in real time as regards to frequency management of so-called white frequency ranges (white spaces) in distributed systems with mobile participants Providing alternative frequency channels for possible diversion in the case of unexpected attacks or interferences on previously used channels (e.g., for alarm systems/monitoring systems)

Estimation of real environments based on the receive spectrum

Specific suitability as space-saving integrated low cost circuit for automotive key applications, smart phone/mobile phone extensions as well as for smart-home/building atomization.

Although some aspects have been described in the context of an apparatus, it is obvious that these aspects also represent a description of the corresponding method, such that a block or device of an apparatus also corresponds to a respective method step or a feature of a method step. Analogously, aspects described in the context of a method step also represent a description of a corresponding block or detail or feature of a corresponding apparatus. Some or all of the method steps may be performed by a hardware apparatus (or using a hardware apparatus), such as a microprocessor, a programmable computer or an electronic circuit. In some embodiments, some or several of the most important method steps may be performed by such an apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer readable.

Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer.

The program code may, for example, be stored on a machine readable carrier.

Other embodiments comprise the computer program for performing one of the methods described herein, wherein the computer program is stored on a machine readable carrier. In other words, an embodiment of the inventive method is, therefore, a computer program comprising a program code for performing one of the methods described herein, when the computer program runs on a computer.

A further embodiment of the inventive methods is, therefore, a data carrier (or a digital storage medium or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment in accordance with the invention includes an apparatus or a system configured to transmit a computer program for performing at least one of the methods described herein to a receiver. The transmission may be electronic or optical, for example. The receiver may be a computer, a mobile device, a memory device or a similar device, for example. The apparatus or the system may include a file server for transmitting the computer program to the receiver, for example.

In some embodiments, a programmable logic device (for example a field programmable gate array, FPGA) may be used to perform some or all of the functionalities of the methods described herein. In some embodiments, a field programmable gate array may cooperate with a microprocessor in order to perform one of the methods described herein. Generally, the methods are performed by any hardware apparatus. This can be a universally applicable hardware, such as a computer processor (CPU) or hardware specific for the method, such as ASIC.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Apparatus for mobile application, comprising
   a frequency spectrum generator for generating a frequency spectrum of radio waves existing at a physical location at which the apparatus is currently located, said frequency spectrum comprising one or more features being characteristic for this type of physical location,
   a classifier for classifying the frequency spectrum such that the frequency spectrum is assigned to one of at least two classes, wherein a class represents a specific type of a physical location, wherein the classifier classifies the frequency spectrum generated at the physical location into a class representing the type of this physical location based on signal levels of frequencies contained in the frequency spectrum, and
   wherein the apparatus is configured to identify the type of the physical location based on the frequency spectrum comprising the one or more features being characteristic for this type of physical location, which frequency spectrum is generated by evaluating existing radio services and/or interferences at this physical location.

2. Apparatus according to claim 1, wherein the apparatus is further configured to use the information concerning the current position and/or the type of environment to place at least one component in a mobile device into a selected operating state according to the needs and/or depending on the environment.

3. Apparatus according to claim 1, wherein the frequency spectrum generator is configured to generate frequency spectra in a frequency band between 30 kHz and 30 GHz, advantageously between 30 MHz and 30 GHz, more advantageously between 30 MHz and 5 GHz and most advantageously between 80 MHz and 1 GHz.

4. Apparatus according to claim 1, wherein the frequency spectrum generator is configured as a radio receiver with a tunable local oscillator or as a radio receiver with a tunable receiver oscillating circuit.

5. Apparatus according to claim 1, wherein the frequency spectrum generator is configured to detect the frequency spectrum intermittently.

6. Apparatus according to claim 1, wherein the frequency spectrum generator is configured to serially sample the frequency spectrum at discrete frequencies of a frequency raster.

7. Apparatus according to claim 6, wherein the order of sampling the discrete frequencies varies between a first and a second sampling process.

8. Apparatus according to claim 6, wherein the order of sampling the discrete frequencies is selected arbitrarily.

9. Apparatus according to claim 1, wherein the classifier performs classification based on signal levels of the frequencies within the frequency spectrum.

10. Apparatus according to claim 1, wherein the classifier performs classification based on the temporal variation of the frequencies within the frequency spectrum.

11. Apparatus according to claim 1, wherein the apparatus comprises a preselection of at least one previously classified frequency spectrum.

12. Apparatus according to claim 11, wherein the apparatus is configured to compare a frequency spectrum generated at a position of the apparatus to the at least one previously classified frequency spectrum.

13. Apparatus according to claim 1, wherein a class determined by the classifier represents a position of the apparatus and the apparatus comprises an interface for indicating this position.

14. Apparatus according to claim 1, wherein the apparatus comprises a user interface that is configured to indicate a frequency spectrum generated at a position of the apparatus to a user.

15. Apparatus according to claim 1, wherein the apparatus comprises a user interface that is configured to classify a frequency spectrum based on an input of a user.

16. Apparatus according to claim 1 comprising a calculator for calculating a velocity of movement of the apparatus based on a strength of a frequency spectrum of at least one existing frequency at successive detection times.

17. Apparatus according to claim 1, wherein the apparatus comprises an interface, in particular a wireless interface for connecting and communicating with an external device.

18. Apparatus according to claim 1, wherein the apparatus comprises an interface for connecting and communicating with a mobile device comprising at least one component operable in a first and in a second operating state, wherein the apparatus is configured to control the mobile device such that the at least one component is operated selectively in the first or in the second operating state depending on the assigned class.

19. Apparatus according to claim 18, wherein the at least one component is an energy-using member with a higher energy consumption in the first operating state than in the second operating state.

20. Apparatus according to claim 19, wherein the energy-using member is deactivated in the second operating state.

21. Apparatus according to claim 18, wherein the at least one component is a service providing a function of the mobile device and the service is active in the first operating state and inactive in the second operating state.

22. Apparatus according to claim 18, wherein the mobile device is a mobile phone, a smartphone, a tablet or a notebook.

23. Mobile device comprising an apparatus according to claim 1.

24. System with a tag, comprising
a frequency spectrum generator for generating a frequency spectrum of radio waves existing at a physical location at which the tag is currently located, said frequency spectrum comprising one or more features being characteristic for this specific type of physical location,
a memory for storing the frequency spectrum at different generation times,
a classifier for classifying the frequency spectrum such that the frequency spectrum is assigned to one of at least two classes, wherein a class represents a specific type of a physical location, wherein the classifier classifies the frequency spectrum generated at the physical location into a class representing the type of this physical location based on signal levels of frequencies contained in the frequency spectrum, and
a tag reader for reading out the memory of the tag and deriving location specific information of the tag at a time at or between the generation times, wherein the tag reader is configured to identify the type of the physical specific location based on the frequency spectrum comprising the one or more features being characteristic for this type of physical location, which frequency spectrum is generated by evaluating existing radio services and/or interferences at this physical location.

25. Method for operating an apparatus for mobile application, the method comprising:
generating a frequency spectrum of radio waves existing at a physical location at which the apparatus is currently located, said frequency spectrum comprising one or more features being characteristic for this type of physical location,
classifying the frequency spectrum such that the frequency spectrum is assigned to one of at least two classes, wherein a class represents a specific type of a physical location, wherein the step of classifying the frequency spectrum generated at the physical location into a class representing the type of this physical location is based on signal levels of frequencies contained in the frequency spectrum, and
identifying the type of the physical location based on the frequency spectrum comprising the one or more features being characteristic for this type of physical location, which frequency spectrum is generated by evaluating existing radio services and/or interferences at this physical location.

26. Method according to claim 25, wherein the method comprises:
placing at least one component in a mobile device into a selected operation state according to the needs and/or depending on the environment.

27. A non-transitory digital storage medium having a computer program stored thereon to perform the method for operating an apparatus for mobile application, the method comprising:
generating a frequency spectrum of radio waves existing at a physical at which the apparatus is currently located, said frequency spectrum comprising one or more features being characteristic for this type of physical location,
classifying the frequency spectrum such that the frequency spectrum is assigned to one of at least two classes, wherein a class represents a specific type of a physical location, wherein the step of classifying the frequency spectrum generated at the physical location into a class representing the type of this physical location is based on signal levels of frequencies contained in the frequency spectrum, and
identifying the type of the physical location based on the frequency spectrum comprising the one or more features being characteristic for this type of physical location, which frequency spectrum is generated by evaluating existing radio services and/or interferences at this physical location, when said computer program is run by a computer.

28. Apparatus according to claim 1, wherein the classifier is configured to analyze the generated frequency spectrum according to whether, and at what intensity, specific frequencies occur in this generated frequency spectrum, and wherein the classification of the frequency spectrum into the specific class is performed in dependence on the analyzed signal characteristic.

29. Apparatus according to claim 1, wherein the apparatus is configured to map the frequencies of the frequency spectrum in a spectrogram, and wherein the apparatus is further configured to identify the current specific location and channel characteristics at this current specific location based on an evaluation of signal levels of different transmitters in the spectrogram.

* * * * *